United States Patent [19]
Nakata et al.

[11] Patent Number: 5,645,739
[45] Date of Patent: Jul. 8, 1997

[54] METHOD OF MANUFACTURING A LIGHT SOURCE UNIT

[75] Inventors: Naotarou Nakata; Naofumi Aoki; Kazutoshi Yamazaki, all of Kyoto, Japan

[73] Assignee: Rohm Co., Ltd., Kyoto, Japan

[21] Appl. No.: 592,524

[22] Filed: Jan. 26, 1996

Related U.S. Application Data

[60] Continuation of Ser. No. 189,876, Feb. 1, 1994, abandoned, which is a division of Ser. No. 964,155, Oct. 21, 1992.

[30] Foreign Application Priority Data

| | | | |
|---|---|---|---|
| Oct. 21, 1991 | [JP] | Japan | 3-302279 |
| Oct. 21, 1991 | [JP] | Japan | 3-302280 |
| Nov. 5, 1991 | [JP] | Japan | 3-318493 |
| Dec. 17, 1991 | [JP] | Japan | 3-353671 |
| Feb. 20, 1992 | [JP] | Japan | 4-033026 |
| Feb. 20, 1992 | [JP] | Japan | 4-033027 |
| Mar. 31, 1992 | [JP] | Japan | 4-076530 |

[51] Int. Cl.$^6$ ................................................. B23K 26/00
[52] U.S. Cl. ............................. 219/121.64; 219/121.63; 219/121.85
[58] Field of Search .......................... 372/121.63, 121.6, 372/121.64, 121.84, 121.85, 70

[56] References Cited

U.S. PATENT DOCUMENTS

| | | | |
|---|---|---|---|
| 3,835,414 | 9/1974 | Ahearn . | |
| 4,319,839 | 3/1982 | Durran | 356/400 |
| 4,358,659 | 11/1982 | Spohnheimer | 219/121 |
| 4,562,350 | 12/1985 | Thirouard et al. . | |
| 4,601,452 | 7/1986 | Rando . | |
| 4,720,168 | 1/1988 | Kaneko | 359/641 |
| 4,901,325 | 2/1990 | Kato et al. . | |
| 4,959,761 | 9/1990 | Critelli et al. | 257/99 |
| 4,993,801 | 2/1991 | Sarraf | 359/641 |

FOREIGN PATENT DOCUMENTS

| | | |
|---|---|---|
| 31 02 185 A1 | 11/1981 | Germany . |
| 33 00 902 A1 | 7/1984 | Germany . |
| 40 21 434 A1 | 2/1991 | Germany . |

*Primary Examiner*—Mark H. Paschall
*Attorney, Agent, or Firm*—Nikaido, Marmelstein, Murray & Oram LLP

[57] ABSTRACT

A plurality of light emitting units are prepared each of which is provided with a laser diode having a laser diode chip which emits one beam and a collimator lens for converting a beam emitted from the laser diode into a parallel beam. The light emitting units are fixed to a bar body so as to be in a row. A plurality of such bar bodies are prepared, and by fixing the bar bodies to a substrate, the light source units are arranged in a matrix form. The positions of the light emitting units are adjusted and fixed after the light emitting units are fitted in the bar bodies so that a plurality of beams emitted from the laser diodes are in parallel with one another at predetermined intervals.

2 Claims, 18 Drawing Sheets

5,645,739

METHOD OF MANUFACTURING A LIGHT SOURCE UNIT

This application is a continuation of application Ser. No. 08/189,876 filed Feb. 1, 1994 now abandoned, which in turn is a divisional of application Ser. No. 07/964,155, filed Oct. 21, 1992 now pending.

BACKGROUND OF THE INVENTION

1. Field of the Invention

The present invention relates to a light source unit for use in a laser beam printer, a copying apparatus, a facsimile apparatus, a phototype setting apparatus, a bar code reading apparatus, and a sensor, and to its manufacturing method, adjusting method and adjusting apparatus.

2. Description of the Prior Art

Light source units constituted by semiconductor lasers (for example, laser diodes) are used as laser beam irradiating apparatuses for forming images such as letters on a photoreceptor drum at a high speed in image forming apparatuses such as laser beam printers, copying apparatuses and facsimile apparatuses. In phototype setting apparatuses, light source units are used as laser beam apparatuses for high-speed printing onto film. In bar code reading apparatuses and various sensors, light source units are used as laser beam irradiating apparatuses for obtaining information from bar codes and light beams reflected by an object.

In well-known, typical apparatuses using the above-mentioned light source unit, one laser beam is formed by a pair consisting of a semiconductor laser and a lens which serves as a collimator, and the laser beam is reflected by a polygonal scanner to form an image on a predetermined surface.

In such an arrangement using one semiconductor laser, since a processing speed depends on a scanning speed, it is impossible to increase the processing speed beyond a limit.

To solve such a problem, an apparatus has been proposed where two or three monolithic laser stripes are formed and two or three light emitting points are provided in one package. With this arrangement, it is possible to generate two or three laser beams for scanning. As a result, the processing speed can be realized which is two or three times the processing speed of the apparatus where only one semiconductor laser is used.

In the above-described arrangement where a plurality of monolithic laser stripes are generated, however, it is difficult to cause all the laser stripes to emit laser beams with an equal intensity. If, in order to solve this problem, laser emission were controlled by monitoring a laser beam emitted from a rear end surface of each semiconductor laser by use of a corresponding photodiode, the monitored laser beams would overlap one another and it would be difficult to separate the monitors into each monitored laser beam.

Moreover, in an arrangement where a plurality of monolithic laser stripes are formed as described above, it is necessary to increase the number of leads accordingly. Since the number of light emitting points in one package is limited, the processing speed can be increased by only several times.

Further, in the previously-described typical light source unit, the semiconductor laser and the collimator lens are normally fixed to a fixing member through laser welding.

FIG. 1 shows a manner in which a semiconductor laser 220 is fixed to a body 230 which serves as a fixing member through YAG laser welding. The YAG laser welding is performed by irradiating one YAG laser beam LB onto a boundary (welding point P) of the body 230 and the semiconductor laser 220 from a YAG laser irradiating nozzle unit 210.

The welding point P (with a diameter of approximately 0.3 mm) which is momentarily melted shrinks while it is cooled and hardened again. The semiconductor laser 220 is drawn by a resultant force, and shifts toward the side of the welding point P. The movement amount thereof ranges from approximately 1 μm to several tens of microns.

As a result, even if fine positioning of approximately 1 μm order is performed with respect to the semiconductor laser 220, the laser 220 is fixed under a condition where there is a position shift through the succeeding laser welding. Moreover, when a lens is fixed to the body 230, a similar problem arises in fixing to the body 230 a lens barrel to which the lens is fixed.

SUMMARY OF THE INVENTION

A first object of the present invention is to provide a light source unit with which a processing speed can be increased by irradiating a plurality of light beams in an apparatus using a light beam.

A second object of the present invention is to provide a method of manufacturing a light source unit where a light emitting means or an optical system does not shift even though laser welding is performed after fine positioning is performed with respect to the light emitting means or the optical system.

A third object of the present invention is to provide a light source unit adjusting method and adjusting apparatus for a light source unit with which optical positioning adjustment is easily made and a defection loss can be minimized when a maladjustment is made.

To achieve the above-mentioned first object of the present invention, a light source unit of the present invention is provided with: a plurality of light emitting means each of which includes a package provided with a light emitting chip which emits one beam and an optical system for converting a beam emitted from the package into a parallel beam; and a fixing member for integrally fixing the plurality of light emitting means in a predetermined arrangement.

With such a feature, since one beam is irradiated from one light emitting means, the positioning of the package and the positioning of the optical system are performed under the same condition with respect to each light emitting means. As a result, it is possible to control the intensity of beam emission so that a beam of a uniform intensity is obtained from any of the light emitting means.

To achieve the above-mentioned second object, a light source unit manufacturing method of the present invention is: light beam supplying means is arranged at a predetermined position on a fixing member in a direction intersecting one surface of the fixing member, and laser welding is performed simultaneously with respect to two points of contact at which a boundary of a periphery of the light beam supplying means and the one surface of the fixing member and two virtual parallel lines arranged opposite to each other with respect to the boundary are in contact.

In such a method, even though the light beam supplying means is drawn toward the welding point side by shrinkage of the welding points, since tensional stress simultaneously works from both sides, the light beam supplying means does not shift.

To achieve the above-mentioned third object, a light source unit adjusting method of the present invention is: A gap is provided between a package attachment portion and an optical system attachment portion on the fixing member, and chucking means which is in contact with the optical system from the gap side or the reverse side of the optical system is provided so as to move along the optical axis of the optical system.

If a focus position of the optical system is adjusted by such a method, no decentering of the optical system is induced by the adjustment. As a result, a beam emitted from the light source unit is not shift from a predetermined irradiation position.

A light source unit adjusting apparatus used in the adjustment by the-above described adjusting method is provided with: beam focus position detecting means for detecting a focus position of a beam having passed through the optical system; chucking means which is in contact with the optical system from the gap side or the reverse side of the optical system; optical system driving means for moving the chucking means along the optical axis of the optical system; and controlling means for controlling driving of the optical system driving means based on an output of the beam focus position detecting means.

With such an arrangement, an adjusting apparatus can be realized with which a position of the optical system can easily and automatically be adjusted.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

To clarify workings and advantages of a first embodiment of the present invention, first, an example of a basic arrangement of a light source unit with which a speed of image forming processing can be increased by irradiating a plurality of beams in an image forming apparatus such as a laser beam printer will be explained with reference to FIG. 2.

Figure 1:
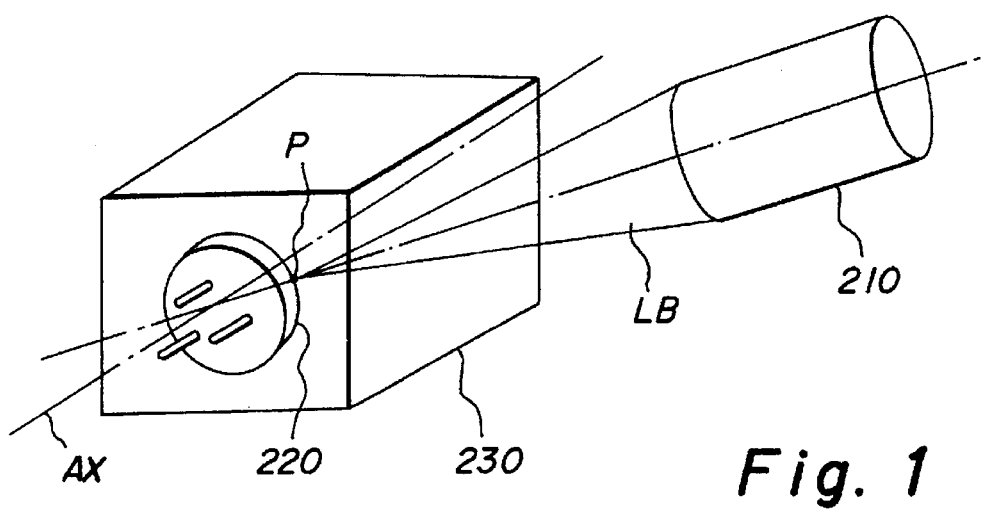
FIG. 1 is an explanatory view of YAG laser welding in a prior art.
Figure 2:
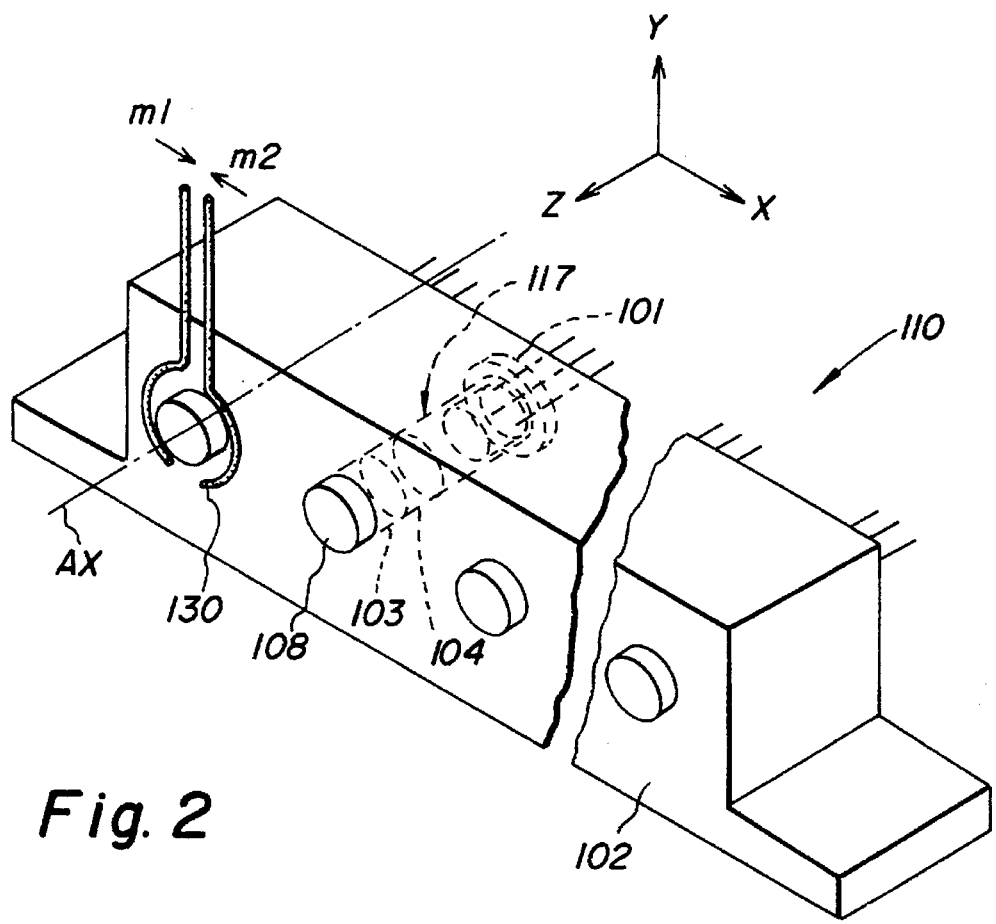
FIG. 2 is an explanatory view of an object of the present invention.

A multi beam irradiating light source unit 110 shown in FIG. 2 includes a bar body 102 which serves as a fixing member, an optical system 108 and a laser diode 101 which is provided in the form of a package. In the bar body 102, a plurality of holes 117 are formed at predetermined intervals. The laser diode 101 is provided with a laser diode chip which emits one beam. The optical system 108 includes a lens 103 for converting a beam emitted by the laser diode 101 into a parallel beam and a lens barrel 104. Into a hole 117, a part of the laser diode 101 is inserted from one side and a part of the lens barrel 104 containing the lens 103 is inserted from the other side.

While only a part of the internal arrangement is shown and some parts are not shown in FIG. 2, each of the optical systems 108 and laser diodes 101 provided to the bar body 102 has a similar attachment arrangement.

In the light source unit 110, in order to adjust a focus position of a laser beam emitted from the laser diode 101, it is necessary to move the optical system 108 along an optical axis AX (that is, along the Z axis). For the movement, it is necessary to make an adjustment by supporting the lens barrel 104 so that an optical path is not intercepted. A typical method used in such a case is to draw and insert the lens barrel 104 out of and into the hole 117 by chucking the lens barrel 104 in directions of arrows m1 and m2 with an optical system chucking member 130 as shown in FIG. 2.

If a focus position of the optical system 108 is adjusted by such a method the optical axis of the optical system 108 will be decentered when the optical system 108 is chucked by the optical system chucking member 130. This is because a force of chucking the optical system 108 by the optical system chucking member 130 moves the optical system 108 along the X and Y axes. If the optical axis is decentered, it will be necessary to make an adjustment with respect to the directions of the X and Y axes in order to correct the decentering. As a result, the operation is complicated to increase the time required for the adjustment.

In the first embodiment of the present invention, the difficulty in position adjustment of an optical system is eliminated, which cannot be realized with the basic arrangement described in the above for comparison.

Figure 3:
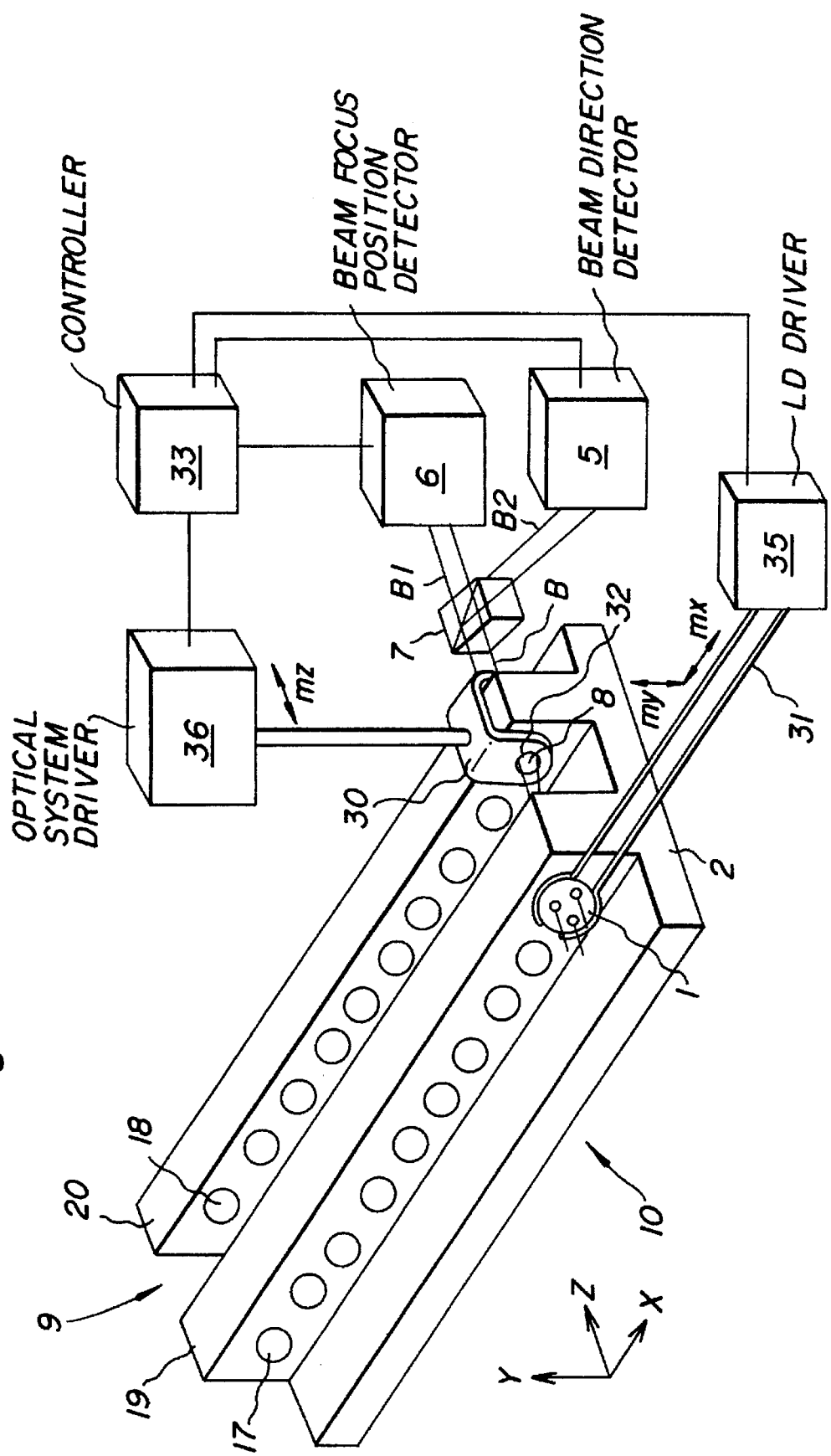
FIG. 3 is a schematic view of an arrangement of a first embodiment of the present invention.
Figure 4:
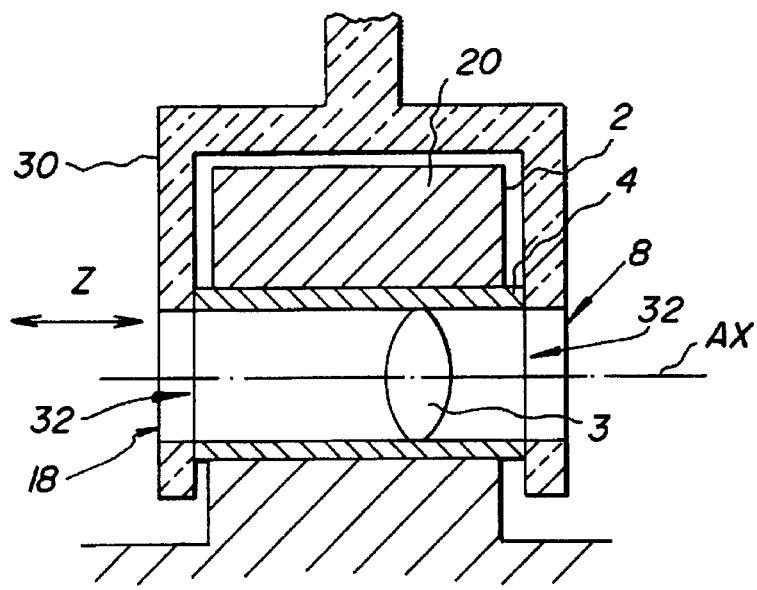
FIG. 4 is a cross-sectional view showing a manner in which a position adjustment is made with respect to an optical system in the first embodiment of the present invention.
Figure 5:
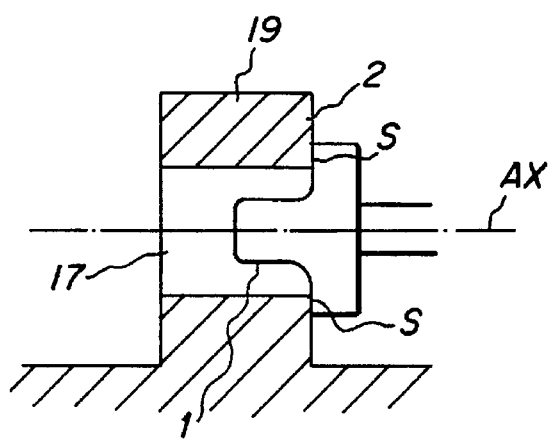
FIG. 5 is a cross-sectional view showing a laser diode and its attachment portion of the first embodiment of the present invention.
Figure 6:
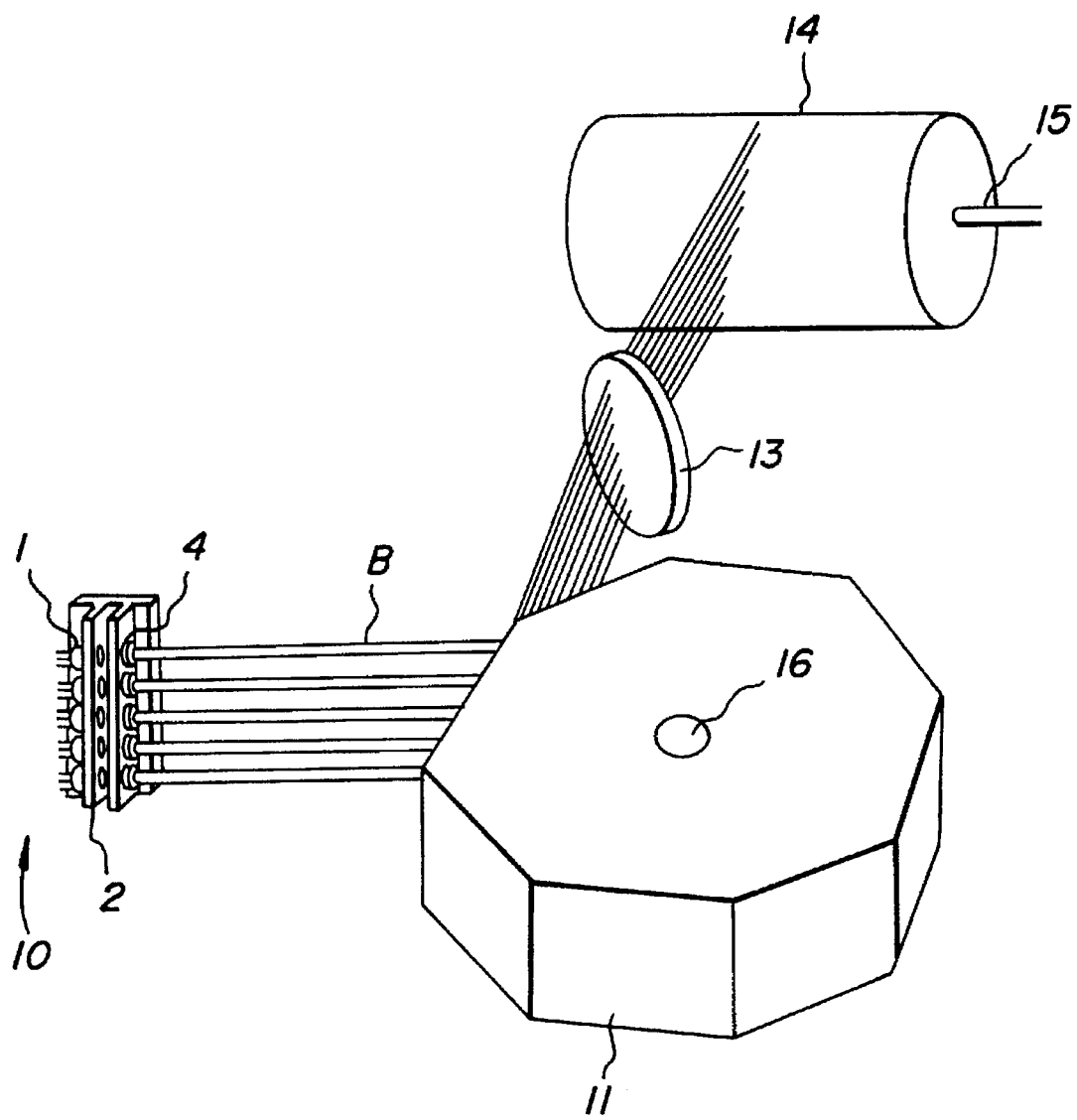
FIG. 6 is an appearance perspective view schematically showing a manner in which an image is formed in a laser beam printer incorporating the first embodiment of the present invention.

FIG. 3 is a schematic perspective view of a general arrangement of the first embodiment of the present invention and shows a manner in which position adjustment of each portion of a light emitting device is made. FIG. 4 is a schematic cross-sectional view of an optical system 8 and its attachment portion of this embodiment and shows a manner in which a position of the optical system 8 is adjusted with an optical system chucking member 30. FIG. 5 is a schematic cross-sectional view of a laser diode 1 and its attachment portion 19 of this embodiment. FIG. 6 is a schematic view of a principal portion of a laser beam printer incorporating this embodiment and shows a manner in which an image is formed by a laser beam emitted by this embodiment.

A light source unit 10 of the first embodiment of the present invention comprises, as shown in FIG. 3, a plurality of light emitting devices including a laser diode 1 and an optical system 8 for converting into a parallel beam a laser beam B emitted from the laser diode 1, and a bar body 2 which serves as a fixing member for integrally fixing the plurality of light emitting devices in a predetermined arrangement. In FIG. 3, only an arrangement of one of the plurality of light emitting devices including the laser diode 1 and the optical system 8 is shown and arrangements of other light emitting devices arranged in an array form are not shown.

The laser diode 1 is a package provided with one laser diode chip (hereinafter referred to as LD chip) which emits one laser beam B and a monitoring photodiode. The intensity of the laser emission of the laser diode 1 is controlled by monitoring the laser beam B with the photodiode. The optical system 8 includes a lens barrel 4 and a lens 3 serving as a collimator as shown in FIG. 4.

As shown in FIG. 3, a groove (gap) 9 is formed in the middle of the bar body 2. The groove 9 is provided in order to make an adjustment of the lens 3 along the Z axis by pushing and drawing the lens barrel 4 of the optical system 8 from the groove 9 side or from the attachment portion 20 side under a condition where the optical system 8 is being fitted in a subsequently-described hole 18. In other words, since it is possible to apply force to the optical system 8 from the groove 9, a position of the optical system 8 can easily be adjusted. As a result, adjustment can be made in a short period of time without hitch.

An attachment portion 19 arranged on one side of the groove 9 is provided with a plurality of holes 17 arranged in an array form for inserting the laser diode 1, while an attachment portion 20 arranged on the other side of the groove 9 is provided with a plurality of hole 18 arranged in an array form for inserting the optical system 8. The holes 17 and 18 are arranged opposite to each other so that the optical axis AX (see FIGS. 4 and 5) can be adjusted when the laser diode 1 and the optical system 8 are repeatedly inserted thereinto. The holes 17 and 18 are arranged in an array of a shape corresponding to a required arrangement of the laser beams B. Grooves may be provided instead of the holes 17 and 18. Moreover, the holes may be arranged in a plurality of rows so that they spread in a plane form.

It is necessary to make an adjustment for aligning directions and focus positions of the laser beams B and intervals therebetween (that is, laser beam positions) as well as to control the intensity of the emission of each laser beam B emitted from the light source unit 10. The position adjustment of each portion of the light emitting device for the alignment will be explained.

First, the lens 3 is located in the center of a fan-shaped laser beam coming out of the laser diode 1. Then, by locating the LD chip at a focus position of the lens 3, a central portion of the beam is converted into a parallel beam.

Then, as shown in FIG. 3, the laser beam B emitted from each light emitting device constituting the light source unit 10 is separated into two laser beams B1 and B2 by a beam splitter 7. A beam focus position of the laser beam B1 is detected by a beam focus position detector 6. Specifically, whether or not the beam B1 is converged or diverged is detected. A beam direction of the laser beam B2 is detected by a beam direction detector 5. Specifically, a degree of parallelization and an inclination of the beam B2 are detected.

Intervals between the laser beams B are determined based on positions of the holes 17 and 18 provided to the bar body 2. A direction of the laser beams B is determined by an adjustment of the laser diode 1 with respect to the directions of the X and Y axes. A focus position of the laser beam B is determined by an adjustment of the lens 3 with respect to the direction of Z axis (FIGS. 3 and 4).

Therefore, based on a detection result by the beam focus position detector 6, the lens barrel 4 (in which the lens 3 is fixed) is moved, as shown in FIG. 4, along the optical axis AX (along the Z axis) in the hole 18. Moreover, based on a detection result by the beam direction detector 5, the laser diode 1 is moved, as shown in FIG. 5, along a surface perpendicular to the optical axis AX. That is, the laser diode 1 is caused to abut against a surface S formed perpendicularly to the optical axis AX under a condition where a part of the laser diode 1 is being inserted into the hole 17, and after an adjustment and positioning are performed with respect to the directions of the X and Y axes (see FIG. 3), the laser diode 1 is fixed at the position. Needless to say, the beam direction detector 5 and the beam focus position detector 6 are not used for image forming operation as shown in FIG. 6, since they are apparatuses required only for the above-described adjustments.

The position adjustment of the laser diode 1 based on a detection result of the beam direction detector 5 and the position adjustment of the lens barrel 4 based on a detection result of the beam focus position detector 6 may manually be made while detection results of the beam direction detector 5 and beam focus position detector 6 are being monitored, or may automatically be made by providing a chucking member which is driven based on outputs of the beam direction detector 5 and beam focus position detector 6.

In this embodiment, as shown in FIGS. 3 and 4, an optical system chucking member (chucking means) 30 is provided to be in contact with the lens barrel 4 from the groove 9 side or the reverse side of the optical system 8, and by moving the chucking member 30 along the optical axis AX (in a direction of arrow mZ of FIG. 3) of the optical system, the position adjustment of the lens barrel 4 is made. To automatically make this position adjustment, an optical system driver 36 and a controller 33 are provided respectively for moving the optical system chucking member 30 along the optical axis of the optical system 8 and for controlling driving of the optical system driver 36 based on an output of the beam focus position detector 6.

Further, a laser diode chucking member (hereinafter referred to as LD chucking member) 31 and a laser diode driver (hereinafter referred to as LD driver) 35 are provided respectively for chucking the laser diode 1 and for moving the LD chucking member 31 along a surface (the surfaces S [see FIG. 5] of the attachment portion 19 against which the laser diode 1 abuts) perpendicular to the optical axis of the laser diode 1 (in directions of arrows mX and mY in FIG. 3). The controller 33 controls driving by the LD driver 35 based on an output of the beam direction detector 5. With this arrangement, position adjustment of the entire light emitting device including the position adjustment of the laser diode 1 is enabled.

Movement amounts of the laser diode 1 and lens barrel 4 are determined based on a result of a comparison between an output of the beam focus position detector 6 and a preset reference value.

Since an opening 32 is provided to the optical system chucking member 30 at a position which coincides with the optical path of the optical system 8, no laser beams are intercepted by the optical system chucking member 50. As a result, it is possible to continue position adjustment of the laser diode 1 until position fixing is completed with respect to one of the light emitting devices while obtaining beam information such as a focus position, a beam inclination and a degree of parallelization detected by the beam focus position detector 6 and beam direction detector 5.

According to such a method, it is possible to realize an accuracy of plus or minus several tens of micron order in assembling a laser chip provided in a one-chip package (corresponding to the laser diode 1 in this embodiment). In a case where a plurality of laser beams are irradiated by one chip, however, the assembling accuracy of the chip is of plus or minus several micron order. That is, according to the above-described conventional method where laser stripes are formed as well as IC patterns are drawn, the number of laser beams is limited to approximately three and a high assembling accuracy is required. On the contrary, according to this embodiment, the assembling accuracy can be lower compared to the method where a plurality of laser beams are formed by one LD chip.

The laser diode 1 and the optical system 8 can be fixed to the bar body 2 through subsequently-described YAG laser welding. In this embodiment, they are fixed through welding by a YAG laser (1.06 μm) at two portions on a surface of the laser diode 1 (with a diameter of 5.6 mm) which surface abuts against the bar body 2.

In the welding by the YAG laser, it is desirable to make the bar body 2, lens barrel 4 and laser diode 1 of the same material (for example, iron). This is because welding can be easily and stably performed.

In the light source unit 10 assembled by fixing the laser diode 1, the lens 3 and lens barrel 4 to the bar body 2 after their positions are adjusted, the laser beams B emitted from a plurality of light emitting devices arranged in an array form are irradiated in parallel with one another at predetermined intervals.

FIG. 6 shows a principal portion of a laser beam printer incorporating this embodiment where five parallel laser beams B are irradiated from the light source unit 10. The laser beams B are reflected by a polygonal scanner 11 which rotates around an axis 16, and after passing through a lens 13, they form a latent image on a charged portion on a photoreceptor drum 14 which rotates around an axis 15 at the same time. Because of the rotation of the polygonal scanner 11, the five laser beams B scan the surface of the photoreceptor drum 14 along the axis 15. As a result, a scanning speed is realized which is five times the scanning speed by the conventional method where scanning is performed by one laser beam B.

As described above, according to this embodiment, since a plurality of light emitting devices including the laser diode 1 having one LD chip and the optical system 8 are arranged in an array form, the processing speed can be increased by multi beam scanning using a plurality of laser beams B. Moreover, a required speed increase rate can be realized by increasing the scale of the light source unit 10 at need.

ON/OFF of each of the laser diodes 1, which are pulse-driven, is independently repeated, respectively. Therefore, it is possible to change gradation by purposely changing the emission intense of the laser diode which is ON. Moreover, since the characteristics of the laser beams B have been aligned through the above-described adjustments, it is possible to use one optical system in common for the plurality of light emitting devices and to provide the light source unit a compatibility with respect to the optical system. For example, the lens 13 (see FIG. 6) provided in the downstream side of the light source unit 10 can be used in common for five beams. As a result, the cost decreases and the position adjustments and maintenance are facilitated.

Moreover, according to this embodiment, since the light source unit 10 is adjusted by the above-described method where the optical system chucking member 30 provided to be in contact with the optical system 8 from the groove 9 side or the reverse side of the optical system 8 are moved along the optical axis of the optical system 8, the optical axis is never decentered. As a result, the position adjustment of the optical system 8 is easily made.

According to this embodiment, an adjusting apparatus for the light source unit is provided with the beam focus position detector 6 for detecting a focus position of a beam emitted from the optical system 8, the optical system chucking member 30 which is in contact with the optical system 8 from the groove 9 side or the reverse side of the optical system 8, the optical system driver 36 for moving the optical system chucking member 30 along the optical axis of the optical system 8, and the controller 33 for controlling driving of the optical system driver 36 based on an output of the beam focus position detector 6. With this arrangement, the position adjustment of the optical system 8 can easily and automatically be made.

Further, since the opening 32 is provided to the optical system chucking member 30 at a position which coincides with the optical path of the optical system 8, the position adjustment of the optical system 8 can easily be made without any influence on the beams.

According to this embodiment, an arranging apparatus for the light source unit is further provided with the beam direction detector 5 for detecting a direction of a beam emitted from the optical system 8, the LD chucking member 31 for chucking the laser diode 1, the laser diode driver 35 for moving the LD chucking member 31 along a surface perpendicular to the optical axis of the laser diode 1, and the controller 33 for controlling driving of the laser diode driver 35 based on an output of the beam direction detector 5. With this arrangement, the position adjustment of the laser diode 1 can easily and automatically be made.

Since a part of the laser diode attachment portion 19 is used as the perpendicular surface, the adjustment can be made without any decentering by abutting the laser diode 1 against the perpendicular surface.

Subsequently, a method will be described of fixing the laser diode 1 and optical system 8 to the bar body 2 in manufacturing the light source unit 10 of the above-described arrangement.

Figure 7:
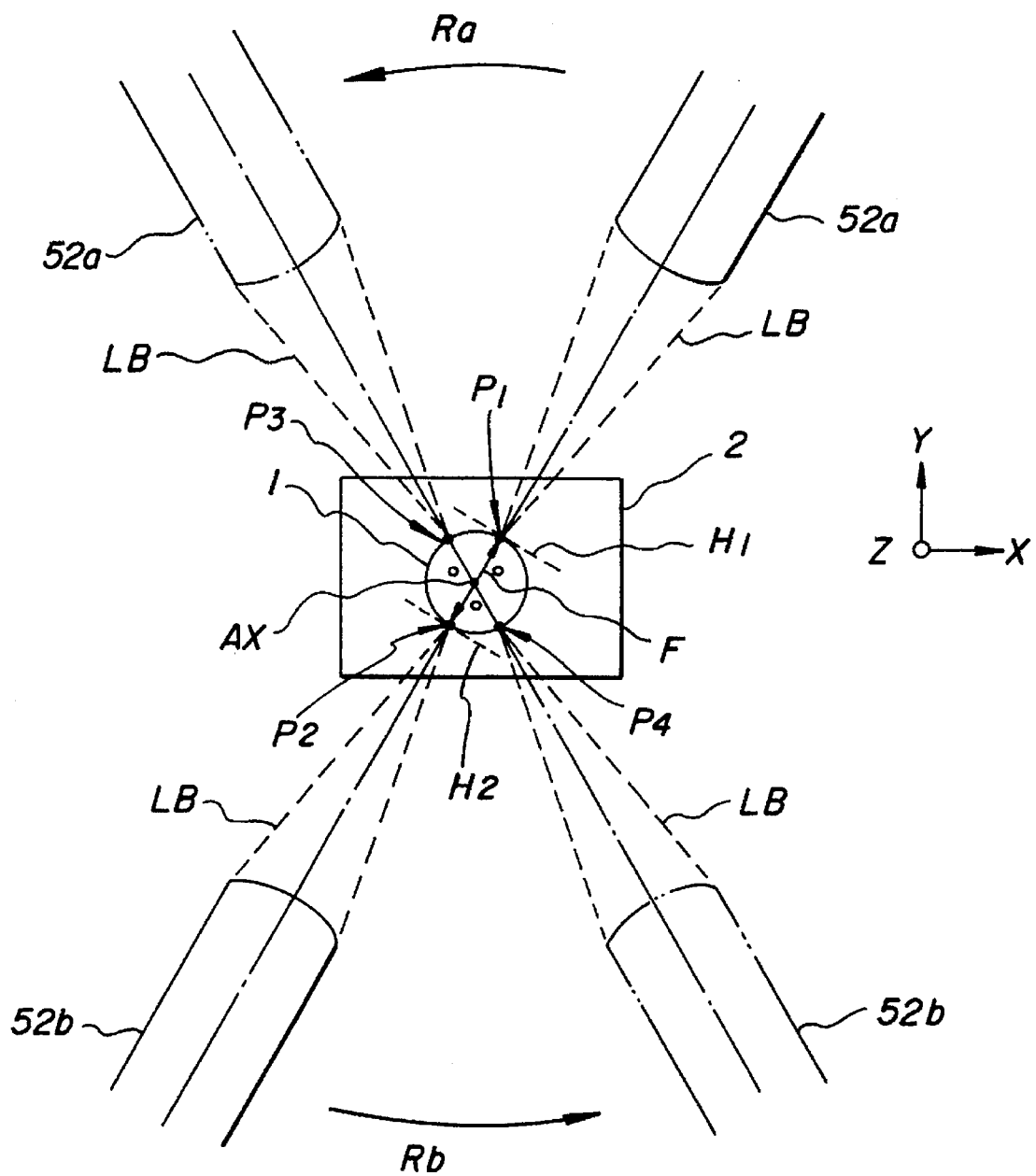
FIG. 7 is a view showing a manner in which YAG laser welding is performed in the first embodiment of the present invention.

FIG. 7 shows a manner in which the laser diode 1 is YAG-welded to the bar body 2.

First, the laser diode 1 which is a semiconductor laser (an iron-made package with a diameter of 5.6 mm plated with nickel and gold) is inserted into a hole (hole 17 for inserting the laser diode 1) provided to penetrate the bar body 2 along the Z axis from one side of the hole, and then, the laser diode 1 is positioned (with a light emitting point (located on the optical axis AX) of the laser diode as a reference position. While the positioned condition is being maintained, YAG laser beams LB of the same intensity are simultaneously irradiated from both of YAG laser irradiating nozzle units 52a and 52b (shown by solid lines) arranged opposite to each other with the optical axis AX in the middle. The welding points are a welding point P1 by a YAG laser beam from the YAG laser irradiating nozzle unit 52a and a welding point P2 by a YAG laser beam from the YAG laser irradiating nozzle unit 52b.

As shown in FIG. 7, the two welding points P1 and P2 are determined in the following manner: Two parallel flat surfaces H1 and H2 in contact with boundaries of the periphery of the laser diode and one surface of the bar body 2 are determined, and a straight line drawn so as to pass through the optical axis AX of the laser diode 1 is determined and then, two intersections of the surfaces H1 and H2 and the straight line are determined. The two intersections are the welding points P1 and P2. While the two flat surfaces H1 and H2 which are in contact with the periphery of the laser diode 1 at the two intersections are naturally parallel to each other in this embodiment since the laser diode 1 is cylindrical, in a case where the periphery of the laser diode 1 is a curved surface whose shape differs at positions, the two welding points P1 and P2 are determined so that the two flat surfaces which are in contact with the curved surface at the welding points are parallel to each other. In a case where the periphery of the package of the laser diode 1 is a flat surface, since the above-mentioned boundary and the flat surfaces coincide, the two welding points P1 and P2 are determined so that the two flat surfaces on which the intersections are present are parallel to each other. In these cases, the welding points P1 and P2 must also be located on the straight line passing through the optical axis AX.

The welding points P1 and P2 (with a diameter of approximately 0.3 mm) which are momentarily melted by the heat of the YAG laser beam LB shrink when cooled to be harden. A resultant tensional force (shrinkage force) F, however, pulls the laser diode 1 from both sides simultaneously with the same strength. As a result, the two forces are brought in equilibrium and counteract each other. Therefore, the laser diode 1 never shifts in welding from a position determined in the position adjustment.

In this embodiment, two YAG laser beams LB are present on one straight line orthogonal to the optical axis AX. If the welding points P1 and P2 are present on the straight line, the equilibrium of shrinkage force is maintained even if two YAG laser beams LB are not present on the same straight line. As a result, the laser diode 1 never shifts from a position determined in the position adjustment.

After the welding with respect to the welding points P1 and P2, the YAG laser irradiating nozzle units 52a and 52b are rotated about the optical axis AX by a predetermined angle (in directions of arrows Ra and Rb). At this time, the YAG laser irradiating nozzle units 52a and 52b may be separately rotated, or the rotation may be made by use of an apparatus in which the YAG laser irradiating units 52a and 52b are integrally formed. After the rotation, YAG laser welding is performed with respect to welding points P3 and P4 by the YAG laser beam LB irradiated from the YAG laser irradiating nozzle units 52a and 52b (shown by alternate long and short dash lines). In this welding, an equilibrium of shrinkage force similar to that of the YAG laser welding with respect to the welding points P1 and P2 is maintained.

Although a sufficient strength (5 kg or more along the optical axis AX) for practical use can be obtained by the two-point welding (with welding points with diameters of 0.2 to 0.3 mm), the strength (particularly, blast strength) can largely be increased by performing four-point welding like in this embodiment. This is because welding points spread in a plane form not in a line form. In performing welding of four or more points, while the two-point welding is repeated in this embodiment, welding of four or more points may simultaneously be performed as far as welding with respect to two opposite points is simultaneously performed.

Into the optical system inserting hole 18 of the bar body 2, the nickel-plated lens barrel 4 in which a lens (with a focal length of 5 mm) is fixed is inserted. The position of the lens barrel 4 is adjusted so that its optical axis coincides with the optical axis AX. Then, similarly to the laser diode 1, the lens barrel 4 is fixed to the bar body 2 through YAG laser welding with respect to two positions. In order to accurately position the laser diode 1 and lens barrel 4, it is desirable to perform the welding of the lens barrel 4 before the welding of the laser diode 1. With respect to the lens barrel 4, since laser welding is performed in a manner similar to the laser diode 1, a shift of the lens barrel 4 due to the shrinkage of welding points is prevented.

By the conventional method where YAG laser welding is performed separately with respect to each welding point, the laser diode 1 and the lens barrel 4 shift by 10 to 20 µm due to the shrinkage of welding points. On the contrary, by the method of the present invention in which welding is simultaneously performed with respect to opposite points, the shift amounts of the laser diode 1 and lens barrel 4 can be reduced to 2 µm or less.

In this embodiment, a plurality of laser diodes 1 and a plurality of optical systems 8 are provided to a single bar body 2, and each laser diode 1 is welded by the above-described method. The method of the present invention will produce similar advantages if used in a case where one light emitting device and one optical system are fixed to one body.

As described above, according to this embodiment, it is possible to weld the laser diode 1 with respect to which fine positioning of a micron order is performed with no position shifts. However, there are cases where the position of the laser diode 1 is slightly shifted due to position shifts of the welding points and a timing difference in the two-point welding.

Figure 8A:
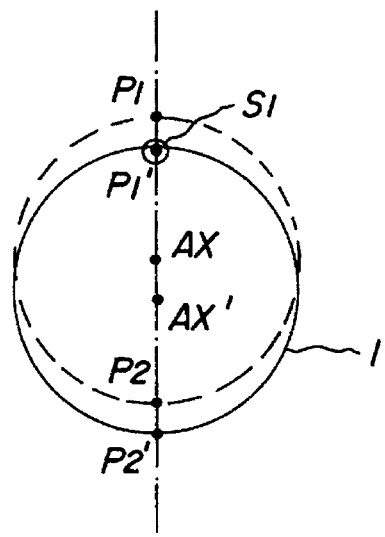
FIGS. 8A and 8B are explanatory views of a position correction of a laser diode by another manner.
Figure 8B:
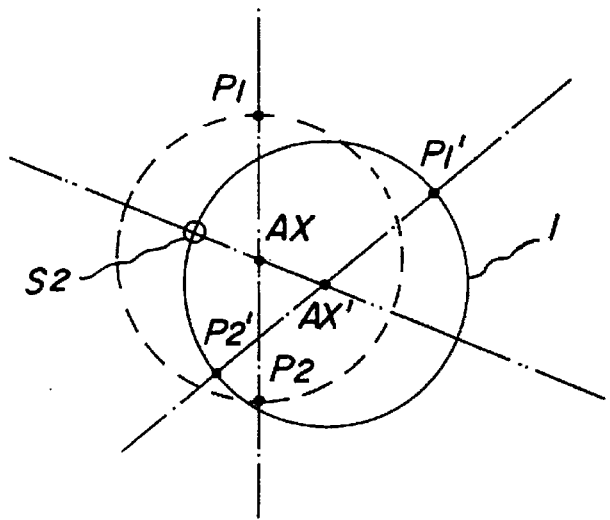

An embodiment where such a position shift of the laser diode 1 can be corrected will be described with reference to FIGS. 8A and 8B. FIG. 8A shows a case where a position shift is caused along a straight line passing through the welding points P1 and P2 and orthogonal to the optical axis AX. FIG. 8B shows a case where an irregular position shift is caused with respect to the welding points P1 and P2. The welding points P1 and P2, and the optical axis AX under a condition where the laser diode 1 has not shifted (shown by a dotted line) correspond to welding points P1' and P2', and an optical axis AX' under a condition where the laser diode 1 has shifted (shown by a solid line).

When the laser diode 1 is shifted as shown in FIG. 8A, laser welding is performed with respect to the welding point P1 or a position correcting welding point S1 located in the vicinity of the welding point P1. Through this welding, the laser diode 1 is returned to the condition where it has not shifted (shown by the dotted line) by a shrinkage force generated at the welding point S1.

When the laser diode 1 is shifted as shown in FIG. 8B, laser welding is performed with respect to a position correcting welding point S2 located on a side surface of the laser diode 1 which surface is located on a straight line orthogonal to the optical axes AX and AX', or in the vicinity thereof. Through this welding, the laser diode 1 is returned in the direction of the condition where it has not shifted (shown by the dotted line) by a shrinkage force generated at the welding point S2.

In either of the cases of FIGS. 8A and 8B, it is possible to correct a position shift of approximately 1 μm only by performing YAG laser welding with respect to one welding point located on a side surface of the laser diode 1 which surface is located on a straight line orthogonal to the optical axes AX and AX', or in the vicinity thereof.

As described above, according to the method of welding the laser diode 1 and the optical system 8 to the bar body 2 of this embodiment, the laser diode 1 or the optical system 8 which serves as a light emitting device is arranged at a predetermined position on the bar body 2 which serves as a fixing member in a direction intersecting one surface of the bar body 2, two intersections of two parallel flat surfaces which coincide or are in contact with boundaries of the periphery of the laser diode 1 or the lens barrel 4 of the optical system 8 and one surface of the bar body 2 and a straight line drawn through the optical axis of the laser diode 1 or the optical system 8, and laser welding is simultaneously performed with respect to the two intersections. As a result, the laser diode 1 or the optical system 8 does not shift even though laser welding is performed after fine positioning of the laser diode 1 or the optical system 8 is performed.

Moreover, in a case where the laser diode 1 or the optical system 8 which serves as a light emitting device is arranged at a predetermined position on the bar body 2 which serves as a fixing member in a direction intersecting one surface of the bar body 2, two intersections of two parallel flat surfaces which coincide or are in contact with boundaries of the periphery of the laser diode 1 or the lens barrel 4 of the optical system 8 and one surface of the bar body 2 and a straight line drawn through the optical axis of the laser diode 1 or the optical system 8, laser welding is simultaneously performed with respect to the two intersections, the laser diode 1 or the optical system 8 is shifted due to laser welding, and laser welding is further performed with respect to another point for correcting the position shift. As a result, the position correction of the laser diode 1 or the optical system 8 can be made even in a case where the laser diode 1 or the optical system 8 is shifted.

In the previously-described first embodiment, when a focus position of the optical system 8 is adjusted by moving the optical system 8 along the optical axis AX of the optical system 8 from the groove 9 side or its reverse side, no decentering due to the adjustment is caused. As a result, a beam emitted from the light source unit 10 is not shifted from a predetermined irradiation position. However, according to the first embodiment, the bar body 2 is unstable in structure because of the groove 9 provided to the bar body 2. As a result, positioning of the optical axis of the lens 3 and the optical axis of the laser diode 1 is difficult, and an optical position shift such as a decentering of the optical axes is apt to be caused through use.

Since the laser diode 1 is incorporated in the bar body 2 where the lens barrel 4 is incorporated, optical position adjustment is complicated. Furthermore, if incorporating of the lens barrel 4 to the bar body 2 results in a failure, the bar body 2 which is expensive will be defective. If incorporating of the lens barrel 4 to the bar body 2 in which another lens barrel 4 has already been incorporated results in a failure, the loss will be larger.

A second embodiment of the present invention is intended to solve the above-mentioned problem of the first embodiment and to realize a multi beam irradiating light source unit where the optical position shift hardly occurs.

The second embodiment of the present invention will hereinafter be described with reference to the drawings.

Figure 9:
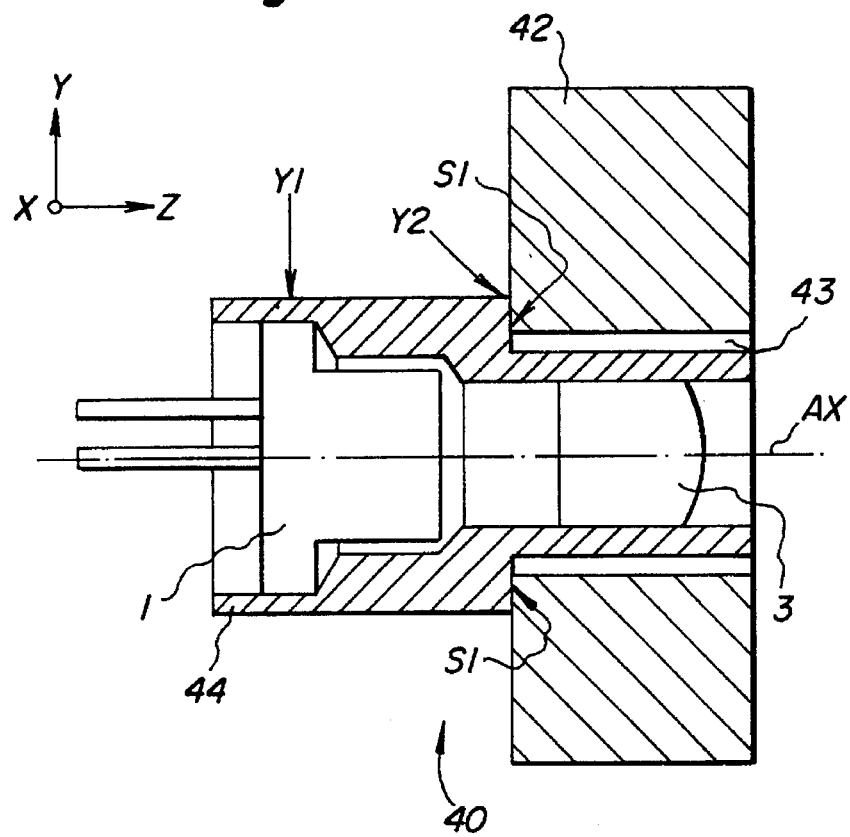
FIG. 9 is a cross-sectional view of a principal portion of a second embodiment of the present invention.

FIG. 9 schematically shows a cross-sectional arrangement of a principal portion of the second embodiment of the present invention. A light source unit 40 of the second embodiment comprises a bar body 42 having holes 43 arranged in a predetermined arrangement, a lens barrel 44 a part of which is inserted into the hole 43 and whose portion which abuts against the bar body 42 is used as a reference surface S1, a laser diode 1 provided with a light emitting chip and provided in the lens barrel 4, and a lens 3 for converting a beam emitted from the laser diode 1 into a parallel beam.

Figure 13:
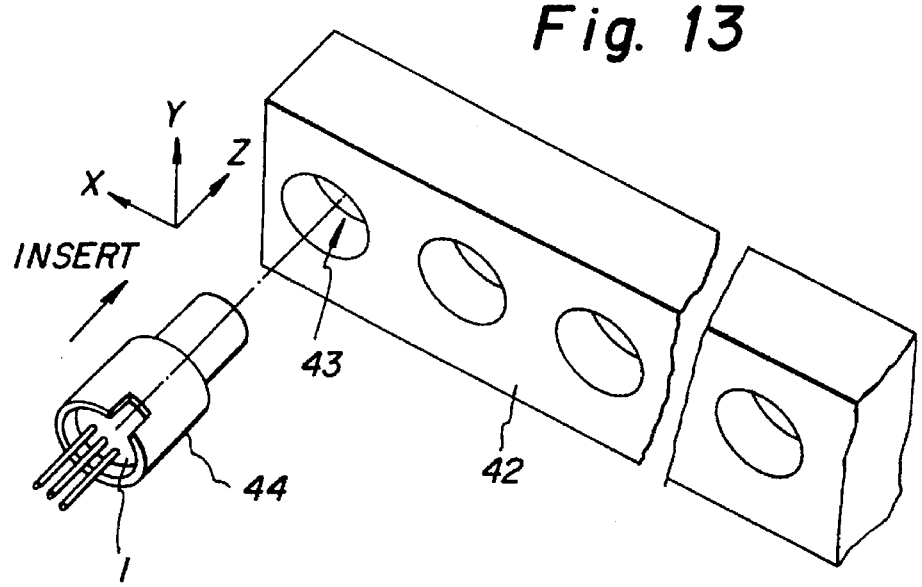
FIG. 13 is an appearance perspective view showing a manner in which the lens barrel used in the second embodiment of the present invention is fitted in a hole provided in the bar body.

As shown in FIG. 13, a plurality of holes 43 are formed in the bar body 42 so as to penetrate the bar body 42. The holes 43 is arranged in an array of a shape corresponding to a required laser beam arrangement.

Figure 11:
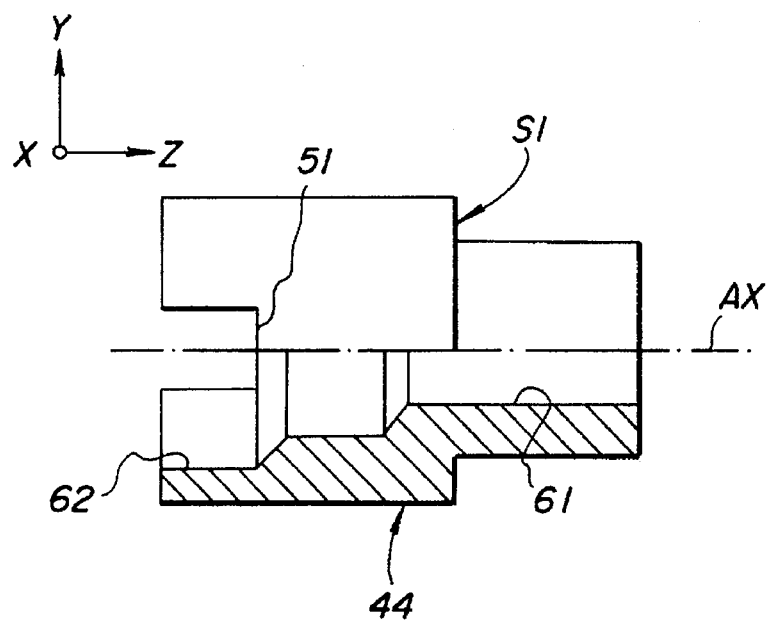
FIG. 11 is a partly broken cross-sectional view of the lens barrel used in the second embodiment of the present invention.
Figure 12:
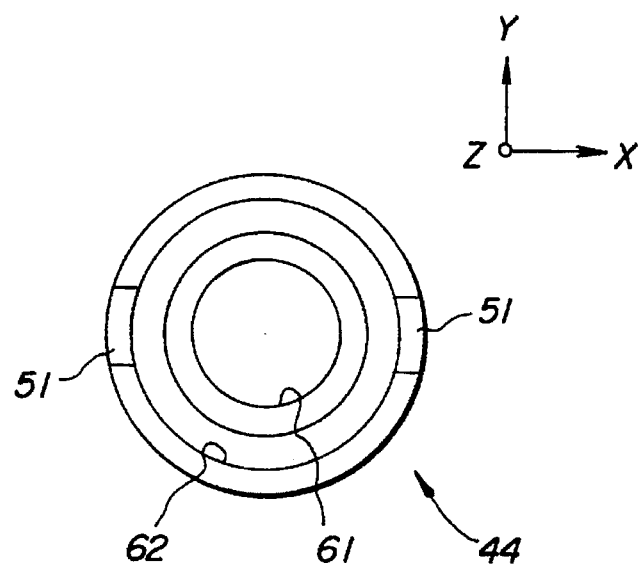
FIG. 12 is a front view of the lens barrel used in the second embodiment of the present invention.

As shown in the partially broken cross-sectional view (the underside of the optical axis AX is the cross section) of FIG. 11 and the front view of FIG. 12, a laser guide portion 62 into which the laser diode 1 is inserted and a lens guide portion 61 to which the lens 3 is fixed are formed in the lens barrel 44. The internal diameters of the laser guide portion 62 and that of the lens guide portion 61 are different.

As shown in FIG. 9, the lens barrel 44 is fixed under a condition where a part of the lens barrel 44 is inserted into the hole 43. The fixing is made through welding by a YAG laser (1.06 82 m) at a position Y2. The lens barrel 44 and the laser diode 1 inserted into the lens barrel 44 are fixed through welding of the YAG laser at a position Y1 from a side surface of the lens barrel 44.

The position adjustment of each light emitting device is made in the following manner for aligning a direction of a laser beam (including a position and pitch interval of a laser beam).

In one adjusting method, the light source unit 40 is assembled which comprises the bar body 42 having the holes 43 arranged in a predetermined arrangement, the lens barrel 44 a part of which is inserted into the hole 43 and whose portion which abuts against the bar body 42 is used as a reference surface S1, the laser diode 1 provided with a light emitting chip and movably inserted in the lens barrel 44, and the lens 3 for converting a beam emitted from the laser diode 1 into a parallel beam, the beam focus position is adjusted by moving the laser diode 1 along the optical axis AX in the lens barrel 44, and the beam direction is adjusted by moving the lens barrel 44, in the hole 43, in a direction perpendicular to the optical axis AX of the laser diode 1 and lens 3.

A specific description will hereinafter be given with reference to FIGS. 9 to 13. First, the lens 3 is located in the center of a fan-shaped laser beam coming out of the laser diode 1, and the central portion of the beam is converted into a parallel beam by locating an LD chip at a focus position of the lens 3. In this example, since the laser diode 1 and the lens 3 are attached in the same lens barrel 44 as shown in FIG. 9, an error caused in attaching the laser diode 1 and the lens 3 in the lens barrel 44 is small. As a result, the concentricity with each other is highly accurate. Such an accuracy is obtained only by a numerically controlled lathe with respect to a single lens barrel 44.

Consequently, the relative positions of the laser diode 1 and lens 3 along the X and Y axes are influenced only by the dimensional accuracy of the lens barrel 44. The bar body 42 has no influence thereon. Therefore, only the relative positions along the X and Y axes are controlled in an adjustment by use of the bar body 42. In an adjustment by use of the lens barrel 44, the accuracies of a position of the lens 3, a position of the laser diode 1 and a relative position of the reference surface S1 which serves as an abutment surface are increased; concerning the bar body 42, only the abutment surface accuracy with respect to the reference surface S1 is increased, and the internal diameter and position of the hole 43 is not necessarily highly accurate. That is, a lower accuracy is required for the bar body 42, so that less amount of adjustment by use of the bar body 42 is required.

First, the lens 3 is moved along the lens guide portion 61 and located accurately at a predetermined position relative to the reference surface S1 which is an abutment surface of the lens barrel 44. A beam incident from the laser diode 1 through the lens 3 is detected by a beam focus position detector (for example, the one as shown in FIG. 3) located at a predetermined distance from the reference surface S1. Specifically, it is detected whether or not the focus position coincides with a predetermined focus position without the beam being converged or diverged. As the beam focus position detector, a conventional one can be used which consists of typical light sensing devices, such as ones with which it is detected based on a peak position of a signal that the focus position coincides with a predetermined focus position.

Figure 10:
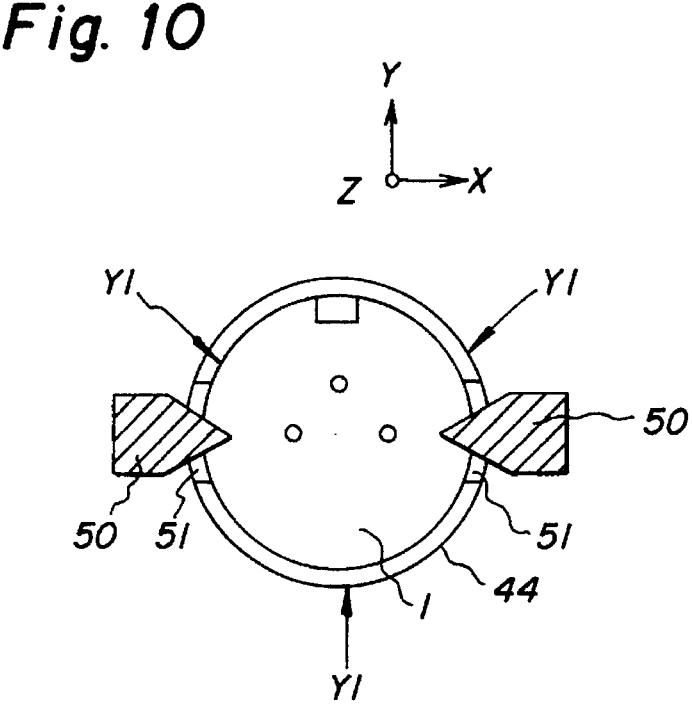
FIG. 10 is a cross-sectional view showing a manner in which position adjustment is made by chucking a laser diode inserted into a lens barrel with a chucking claw in the second embodiment of the present invention.

Then, as shown in FIG. 10, the laser diode 1 is chucked through a clearance groove 51 by a chucking claw 50. Then, the laser diode 1 is moved along the laser guide portion 62 (see FIG. 11) parallel to the optical axis AX. The laser diode 1 is stopped when it is found based on a detection result of the beam focus position detector that the beam focus position coincides with a predetermined position.

The lens barrel 44 and the laser diode 1 are fixed by melting them by use of a YAG laser from the side surface of the lens to the laser diode located inside. Such YAG laser welding is performed simultaneously with respect to three points as shown in FIG. 10. By the simultaneous fixing at three points, the lens barrel 4 and the laser diode 1 are fixed in a well-balanced and stable condition. The fixing position and the number of fixing points may be changed if necessary.

Then, the lens barrel 44 is inserted into the hole 43 of the bar body 42 as shown in FIG. 13 so that the reference surface S1 abuts against the bar body 42 as shown in FIG. 9. The adjustment of the position of the lens barrel 44 with respect to the directions of the X and Y axes is made under a condition where the reference surface S1 is in contact with the bar body 42 at the periphery of the hole 43. A beam incident from the laser diode 1 through the lens 3 is detected by a beam direction detector (for example, the one shown in FIG. 3) located at a predetermined distance from the reference surface S1. Specifically, a degree of parallelization and an inclination of the beam are detected. As the beam direction detector, a conventional one can be used which consists of typical light receiving devices such as ones with which it is detected based on a peak position of a signal that an appropriate beam direction has been realized. Then, the lens barrel 44 and the bar body 42 are fixed simultaneously at three points in a manner similar to the above-described fixing of the laser diode 1 and lens barrel 44.

The above-described fixing of the laser diode 1 and lens barrel 44 and fixing of the lens barrel 44 and bar body 42 may be performed by use of ultraviolet ray adhesive agent.

The laser beam direction is determined based on the positions of the holes 43 formed in the bar body 42 and the adjustment of the lens barrel 44 with respect to the directions of the X and Y axes, while the laser beam focus position is determined in the adjustment of the laser diode 1 with respect to the direction of the Z axis.

By such a method, the assembling accuracy of a laser chip provided in a package (corresponding to the laser diode 1 in this embodiment) having one chip can be of plus or minus several tens of micron order. In a case where a plurality of laser beams are irradiated by one chip, however, the assembling accuracy is of plus or minus several micron order. That is, according to the above-described conventional method where laser stripes are formed as well as IC patterns are drawn, the number of laser beams is limited to approximately three and a high assembling accuracy is required. On the contrary, according to the present invention, the assembling accuracy can be lower compared to the method where a plurality of laser beams are formed by one LD chip.

Figure 19:
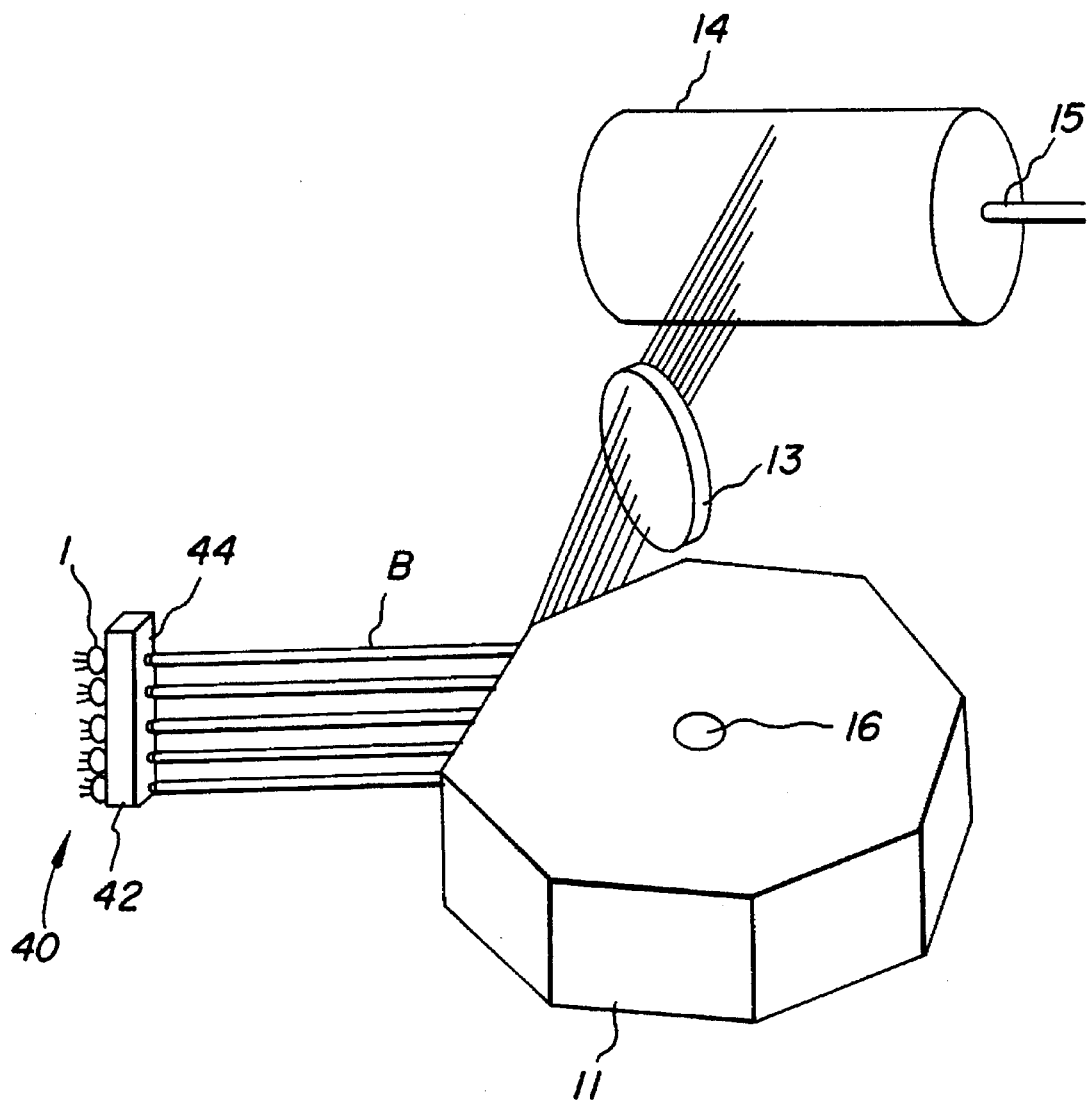
FIG. 19 is an appearance perspective view schematically showing a manner in which an image is formed in a laser beam printer incorporating the second embodiment of the present invention.

FIG. 19 shows a laser printer incorporating the second embodiment. The workings of the light source unit 40 in the printer is similar to that of the printer shown in FIG. 6.

Figure 14:
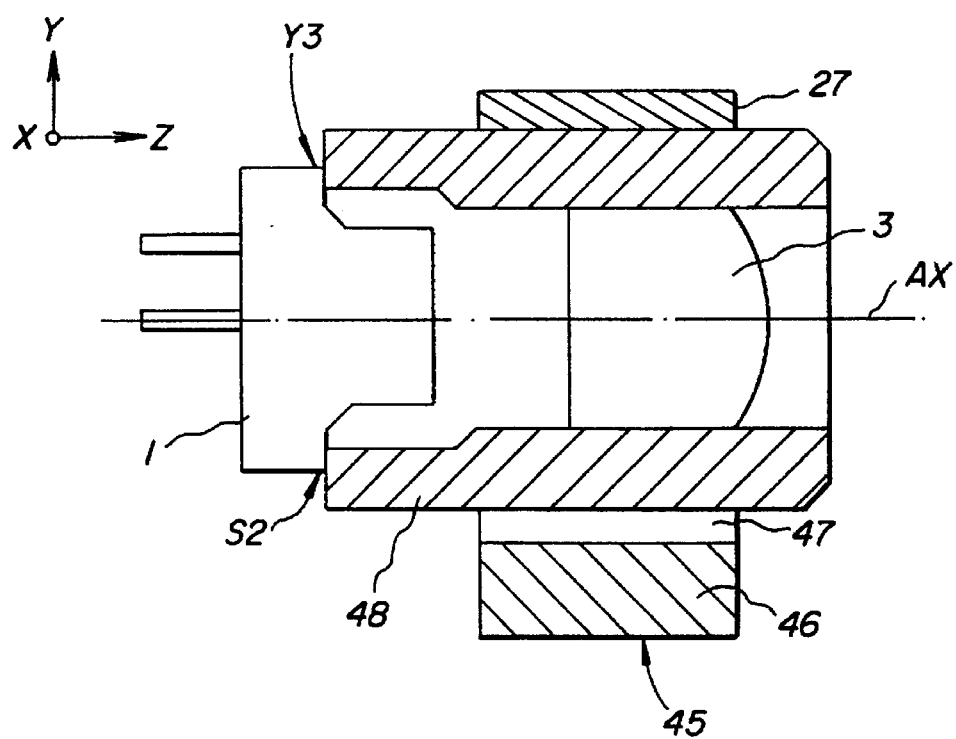
FIG. 14 is a cross-sectional view of a principal portion of a third embodiment of the present invention.

FIG. 14 is a schematic cross-sectional view of a principal portion of a third embodiment of the present invention. A light source unit 45 of the third embodiment comprises a bar body 46 having as an engaging portion a groove 47 arranged in a predetermined arrangement, a lens barrel 48 inserted into the groove 47, a laser diode 1 provided with a light emitting chip and a part of which is inserted into the lens barrel 48 under a condition where the laser diode 1 abuts against a predetermined reference surface S2 of the lens barrel 48, and a lens 3 fixed in the lens barrel 48 for converting a beam emitted from the laser diode 1 into a parallel beam.

Figure 18:
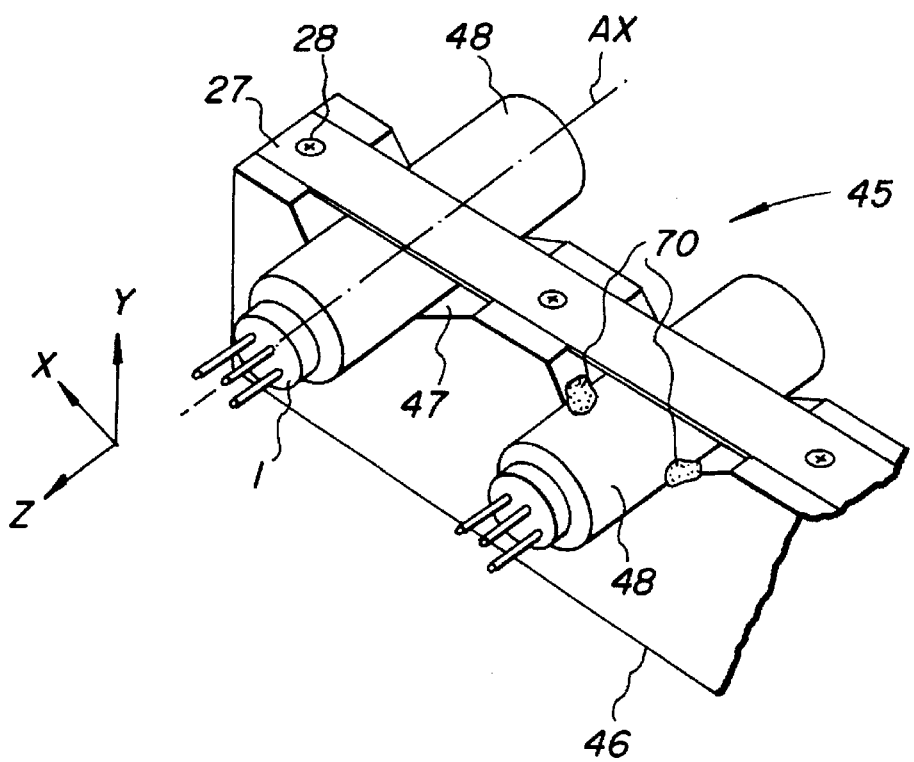
FIG. 18 is an appearance perspective view showing a part of the third embodiment of the present invention under a condition where the lens barrel is fitted through a flat spring in a groove provided to the bar body.

As shown in FIG. 18, the bar body 46 is provided with a plurality of grooves 47 having substantially V-shaped cross sections, which grooves are arranged in an array of a shape corresponding to a required laser beam arrangement. Since the grooves 47 have two inclining surfaces symmetrical with respect to an axis along the Y axis and opposite to each other, the lens barrel 48 hardly shifts along the X axis.

Figure 16:
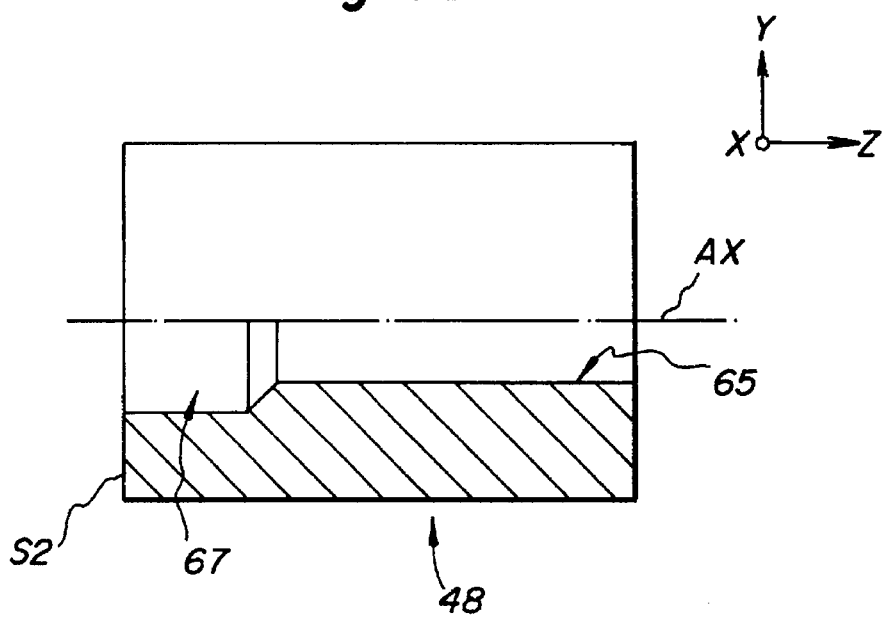
FIG. 16 is a partially broken cross-sectional view of a lens barrel used in the third embodiment of the present invention.
Figure 17:
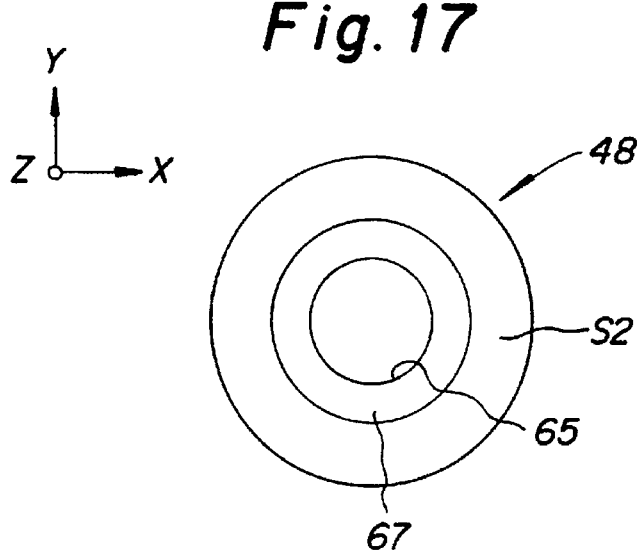
FIG. 17 is a front view of the lens barrel used in the third embodiment of the present invention.

As shown in the partially broken cross-sectional view (the underside of the optical axis AX is the cross section) of FIG. 16 and the front view of FIG. 17, a laser moving portion 67 into which the laser diode 1 is inserted and a lens guide portion 65 to which the lens 3 is fixed are formed in the lens barrel 48. The internal diameter of the laser moving portion 67 and that of the lens guide portion 65 are different.

As shown in FIG. 14, the laser diode 1 is fixed to the lens barrel 48 at a position Y3 through welding by a YAG laser under a condition a part of the laser diode 1 is being inserted into the laser moving portion 67. The lens barrel 48 and the groove 47 are fixed by fixing the lens barrel 48 and the bar body 46 at their abutting surfaces with an adhesive 70 as shown in FIG. 18.

The adjustment of an optical position is made in the following method in the third embodiment.

In this method, the light source unit 45 is assembled which comprises the bar body 46 having the groove 47 arranged in a predetermined arrangement, the lens barrel 48 inserted into the groove 47, the laser diode 1 provided with a light emitting chip and a part of which is inserted into the lens barrel 48 under a condition where the laser diode 1 abuts against a predetermined reference surface S2 of the lens barrel 48, and the lens 3 fixed in the lens barrel 48 for converting a beam emitted from the laser diode 1 into a parallel beam. Thereafter, the beam direction is adjusted by moving the laser diode 1 in a direction perpendicular to the optical axis AX, and the beam focus position is adjusted by moving the lens barrel 48, in the groove 47, along the optical axis AX of the laser diode 1 and lens 3.

A specific description will hereinafter be given with reference to FIGS. 14 to 18. First, the lens 3 is located in the center of a fan-shaped laser beam coming out of the laser diode 1, and the central portion of the beam is converted into a parallel beam by locating an LD chip at a focus position of the lens 3. While concentricity between the laser diode 1 and the lens 3 depends on the processing accuracy of the lens barrel 44 in the previously-described second embodiment, the adjustment with respect to the directions of the X and Y axes is made by causing the laser diode 1 to abut against the reference surface S2 which is an end surface of the lens barrel 48 in the third embodiment.

First, the lens 3 is moved along the lens guide portion 65 and located accurately at a predetermined position relative to the reference surface S2 which is an end surface of the lens barrel 48. Then, a beam incident from the laser diode 1 through the lens 3 is detected by a beam focus position detector (for example, the one as shown in FIG. 3) located at a predetermined distance from the reference surface S1. Specifically, whether or not the optical axis of the lens 3 coincides with the optical axis AX is determined by detecting an inclination of the beam.

Then, the laser diode 1 is chucked by an appropriate chucking member such as the above-mentioned chucking claw 50 (see FIG. 10). Then, the laser diode 1 is moved along the reference surface S2 perpendicular to the optical axis AX. The laser diode 1 is stopped when it is found based on a detection result of the beam focus position detector that the beam direction coincides with a predetermined direction. Then, the lens barrel 48 and the laser diode 1 are fixed at a position Y3 through YAG laser welding.

Figure 15:
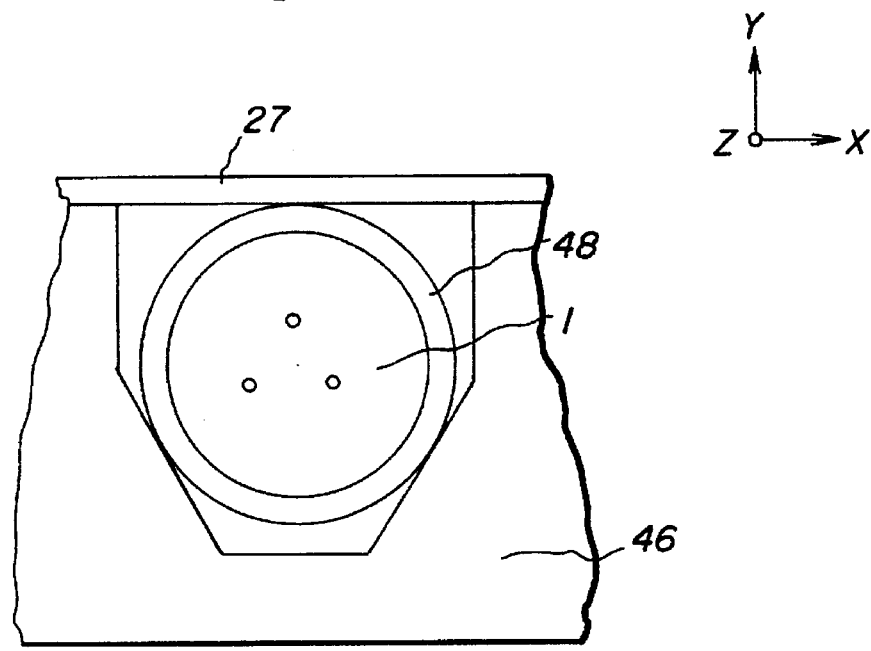
FIG. 15 is a front view of the principal portion of the third embodiment of the present invention.

Then, the lens barrel 48 is placed in the groove 47 as shown in FIGS. 14, 15 and 18, and the lens barrel 48 is pushed toward the bar body 46 side by fixing a flat spring 27 with a screw 28. Then, a beam coming from the laser diode 1 through the lens 3 is detected by a beam focus position detector located at a predetermined distance from the bar body 46. Specifically, it is detected whether or not the focus position coincides with a predetermined focus position without the beam being converged or diverged.

The position adjustment with respect to the direction of the Z axis is made by moving the lens barrel 48 along the optical axis AX (along the Z axis) by use of an appropriate chucking member (one having function such as ones of the optical system chucking member 30 and LD chucking member 31 shown in FIG. 3). The lens barrel 48 is stopped when it is found based on a detection result of the beam focus position detector that the beam focus position coincides with a predetermined position. Then, the lens barrel 48 and the bar body 42 are fixed with the adhesive 70.

Since the groove 47 provided to the bar body 42 has a substantially V-shaped cross section consisting of two inclining surfaces, the pitch intervals (along the X axis) between the lens barrels 48 are hardly influenced even if the external diameter of the lens barrels 48 slightly varies due to errors in manufacturing and distortion caused through use. As a result, a high pitch accuracy is maintained. Therefore, concentricity between the laser diode 1 and lens 3 is determined in the adjustment, with respect to the directions X and Y, of the laser diode which abuts against the reference surface S2, while the laser beam direction is determined mainly based on a position of the groove 47 provided to the bar body 42. Since the focus position is determined in the adjustment with respect to the direction of the Z axis of the lens barrel 48, concerning the adjustment by use of the bar body 46, only the adjustment with respect to the direction of the Z axis is controlled based on the processing accuracy of the groove 47. Since it is unnecessary to make an adjustment for limiting relative position accuracies of the lens 3 and laser diode 1 along the optical axis AX with a dimensional accuracy of the lens barrel 48 with respect to the bar body 46, a lower dimensional accuracy is required for the bar body 42. As a result, less amount of adjustment is required with respect to the bar body 42.

As described above, the light source unit 40 of the second embodiment of the present invention is provided with the bar body 42 serving as a fixing member and having holes 43 arranged in a predetermined arrangement, the lens barrel 44 a part of which is inserted into the hole 43 and whose portion which abuts against the bar body 42 is used as the reference surface S1, the laser diode package 1 provided with a light emitting chip and provided in the lens barrel 4, and the lens 3 fixed in the lens barrel 44 for converting a beam emitted from the laser diode 1 into a parallel beam. As a result, a multi beam irradiating light source unit with which the optical position shift is hardly caused can be realized.

Moreover, according to the method of adjusting the light source unit 40 of the second embodiment, the light source unit 40 is assembled which comprises the bar body 42 having the holes 43 arranged in a predetermined arrangement, the lens barrel 44 whose portion that is formed to have a smaller diameter than the hole 43 is inserted into the hole 43 and whose portion which abuts against the bar body 42 is used as a reference surface S1, the laser diode 1 provided with a light emitting chip and movably inserted in the lens barrel 4, and the lens 3 fixed in the lens barrel 44 for converting a beam emitted from the laser diode 1 into a parallel beam. The beam direction is adjusted by moving the laser diode 1 in a direction perpendicular to the optical axis AX of the laser diode 1 and lens 3 in the lens barrel 44. As a result, the optical position adjustment is easily made, and defection loss due to an adjustment failure can be minimized.

According to the method of adjusting the light surface unit 45 of the third embodiment, the light source unit 45 is assembled which comprises the bar body 46 having the groove 47 serving as an engaging portion and arranged in a predetermined arrangement, the lens barrel 48 inserted into the groove 47, the laser diode 1 provided with a light emitting chip and a part of which is inserted into the lens barrel 48 under a condition where the laser diode 1 abuts against the predetermined reference surface S2 of the lens barrel 48, and the lens 3 fixed in the lens barrel 48 for converting a beam emitted from the laser diode 1 into a parallel beam. The beam direction is adjusted by moving the laser diode 1 in a direction perpendicular to the optical axis AX, and the beam focus position is adjusted by moving the lens barrel 48, in the groove 47, along the optical axis AX of the laser diode 1 and lens S. As a result, the optical position adjustment is easily made, and defection loss due to an adjustment failure can be minimized.

In a case where the groove 47 has a substantially V-shaped cross section, since the difference in external diameter of the lens barrel 48 due to errors hardly influences on the position of the optical axis, the pitch intervals between the plurality of lens barrels fixed to the bar body 46 can highly accurately be set. As a result, the beam direction can accurately be determined.

All of the light source units used in the above-described embodiments are intended to increase the processing speed (for example, image forming processing speed), in apparatuses using beams, by arranging a light emitting device including an optical system and a laser diode in a row along the optical system. If such light source units are arranged in the form of two-dimensionally spreading X—Y matrix by arranging them in two or more rows, an improved performance as a light source unit can be obtained. As a result, the range of use increases compared to a case where they are arranged in one row. For example, it is possible to decrease a pitch between each beam and to radiate a beam onto a radiated surface over and over again by accumulating each light emitting devices so that they are arranged in a row along the Z axis in the light source unit 110 shown in FIG. 2 and by causing each row along an inclination to subsequently emit a beam while the difference in emission time is being electrically corrected under a condition where each row of light emitting devices is inclined by a predetermined angle with respect to a scanning direction of the radiated surface. Moreover, the same advantages can be obtained in a case where the position of each light emitting device is changed so that it is shifted by a predetermined pitch along the X axis in accumulating the light source unit 110 shown in FIG. 2.

However, because of errors produced in manufacturing, the position of the hole 177 relative to the two abutment surfaces (along the Y axis) of the bar body 42 which surfaces are used in the accumulation differs with every bar body 102. Consequently, in accumulating the light source unit 110 directly along the Y axis to locate each light emitting device at predetermined pitches, errors are accumulated as the number of the accumulated light source units increases until they become too large to neglect. As a result, it is impossible to radiate a beam onto a predetermined position.

A fourth embodiment of the present invention is intended to realize a light source unit having a two-dimensional arrangement where such a problem has been solved and to provide a light source unit where the position of the light emitting device having a predetermined two-dimensional arrangement is appropriately adjusted.

Figure 20:
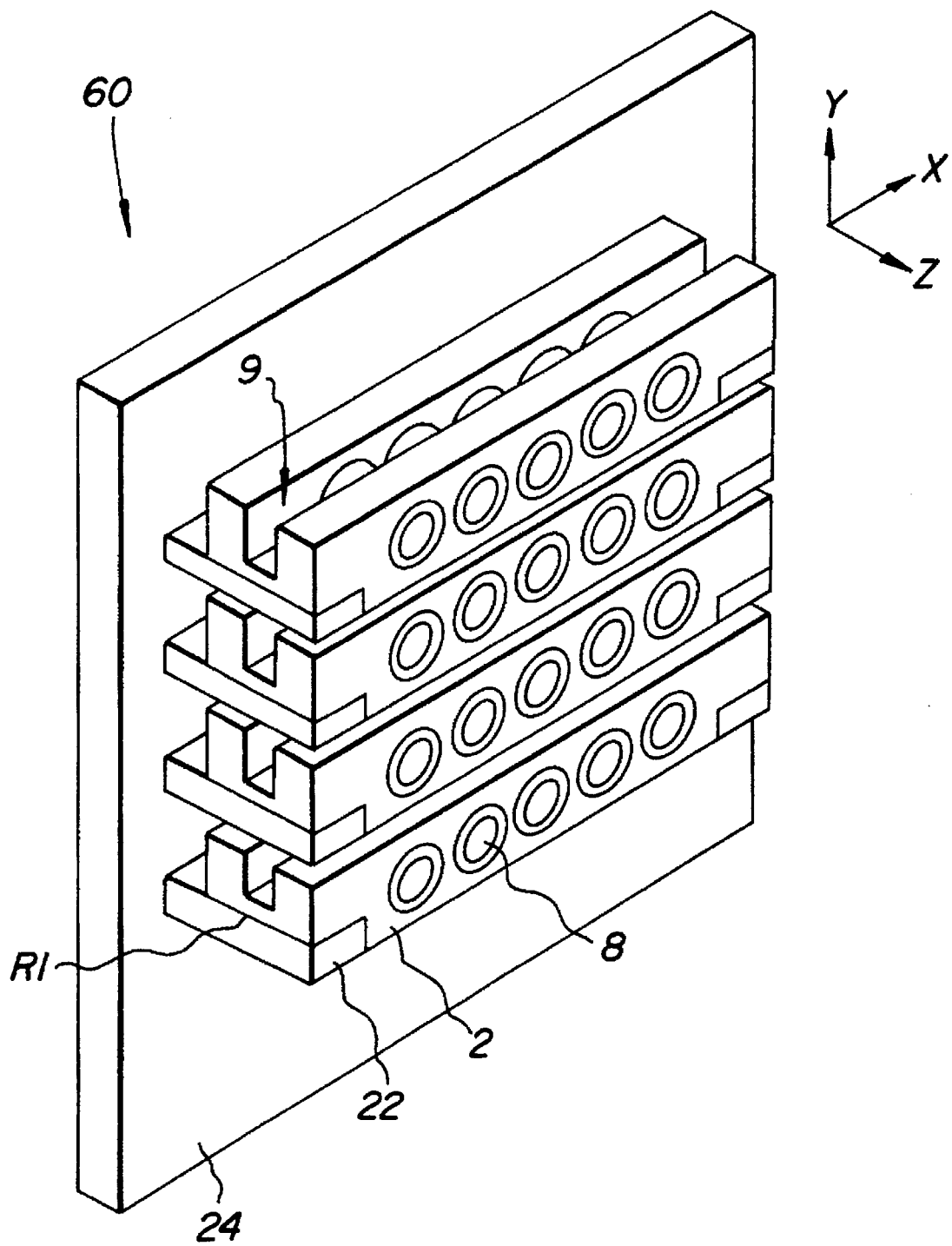
FIG. 20 is an appearance perspective view of an arrangement of a fourth embodiment of the present invention.
Figure 21:
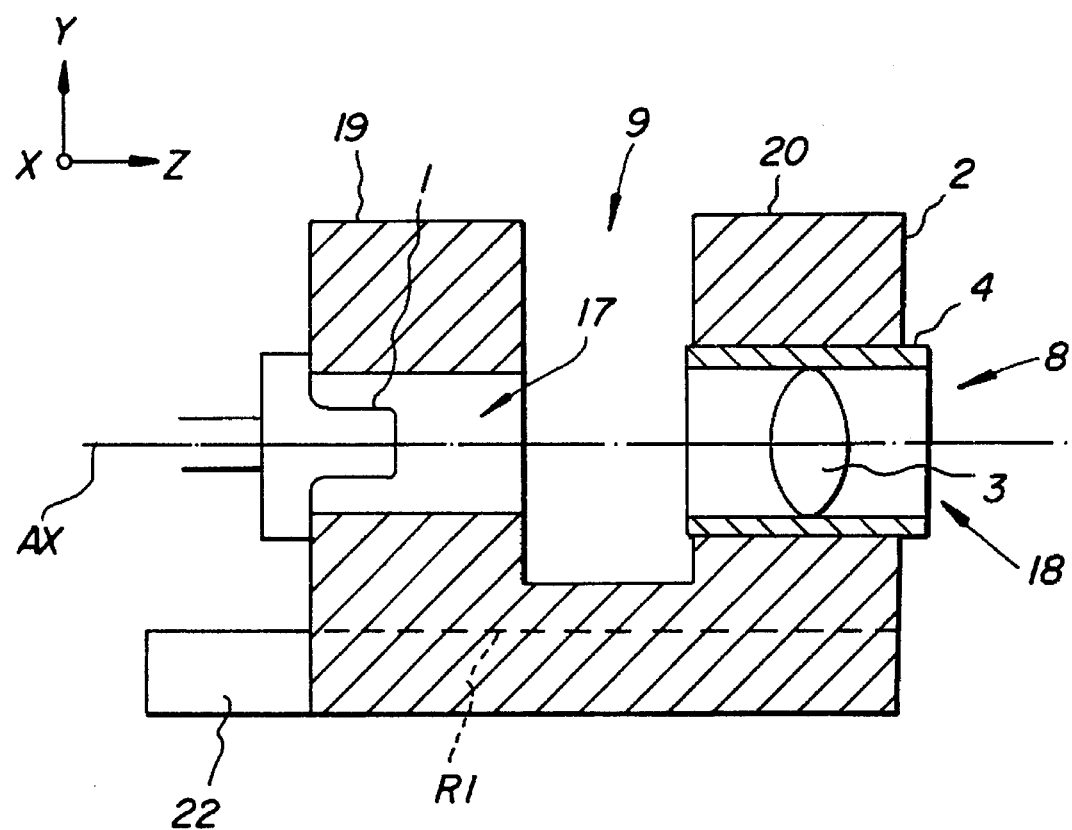
FIG. 21 is a cross-sectional view of a principal portion of the fourth embodiment of the present invention.

The fourth embodiment of the present invention will hereinafter be described with reference to the drawings. FIG. 20 is a perspective view schematically showing a general arrangement of the fourth embodiment. FIG. 21 is a cross-sectional view schematically showing a principal portion of the fourth embodiment. In FIG. 21, a Y—Z cross section of a portion (excluding a substrate 24) along the optical axis of one light emitting device is shown.

A light source unit 60 of this embodiment shown in FIG. 20 includes light emitting device, fixing members, supporting members 22 and a substrate 24. The light emitting device includes, as shown in FIG. 21, a laser diode 1 and an optical system 8 for converting a laser beam emitted from the laser diode 1 into a parallel beam. As the fixing members, a plurality of bar bodies 2 having a reference surface R1 and fixing the light emitting device to a predetermined position relative to the reference surface R1 are used as shown in FIG. 21. The Supporting members 22 support each of the bar bodies 2 through contact with the reference surface R1. The supporting members are arranged in parallel with each other at predetermined intervals on the substrate 24.

The bar body 2 to which the laser diode 1 shown in FIG. 21 is fixed in a row along the X axis is arranged in a two-dimensional arrangement so that each row of light emitting device is arranged at equal intervals by accumulating the bar bodies 2 along the Y axis by fixing supporting member 22 as shown in FIG. 20.

The fixing of the supporting member 22 to the substrate 24 and the fixing of the bar body 22 to the supporting member 22 can be made by a typical fixing method such as adhesive agent and a screw. While the supporting member 22 is a rectangular parallelopiped in this embodiment, it is not limited thereto; it may be, for example, a cylindrical pin as far as it can support the bar body 2 with its reference surface R1.

The reference surface R1 for abutment against the supporting member 22 is formed with a high accuracy with respect to the position of the light emitting device (the distance from the optical axis to the reference surface is 5.0±0.020 mm). Consequently, since the supporting member 22 where surfaces which are in contact with the reference surface R1 are located accurately with predetermined intervals is fixed to the bar body 2, the light emitting devices are accurately arranged in a two-dimensional arrangement at predetermined intervals as shown in FIG. 20.

Figure 22:
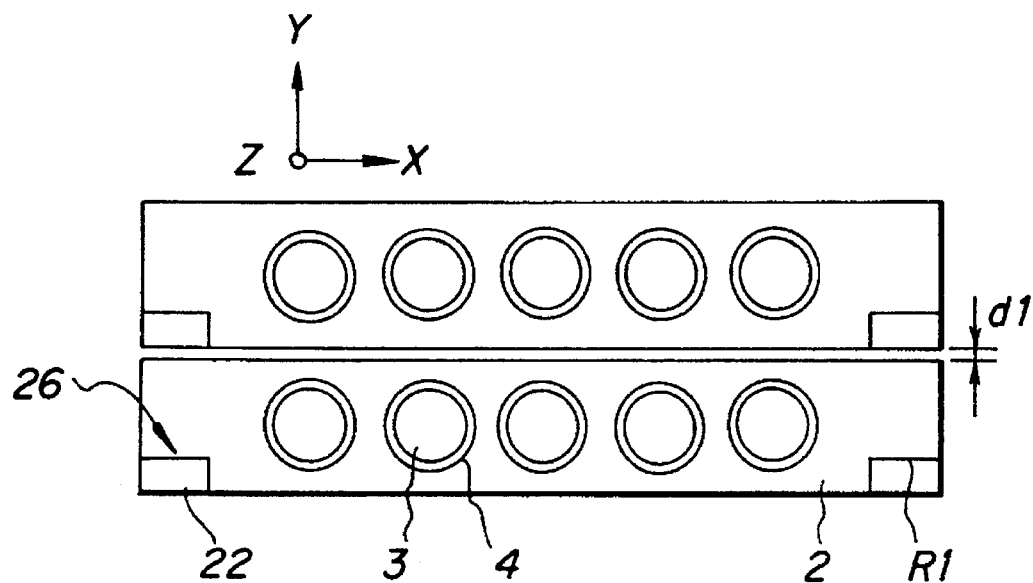
FIG. 22 is a front view of the principal portion of the fourth embodiment of the present invention.

FIG. 22 is a front view of a principal portion of this embodiment. As shown in the figure, a gap d1 provided between the bar bodies 2 absorbs an error of a single bar body 2. As a result, no errors are accumulated in accumulating the light emitting devices along the Y axis, and the difference in position of the light emitting devices along the Y axis is produced only by the pitch error of the supporting member 22 on which the bar body 2 is placed.

Figure 23:
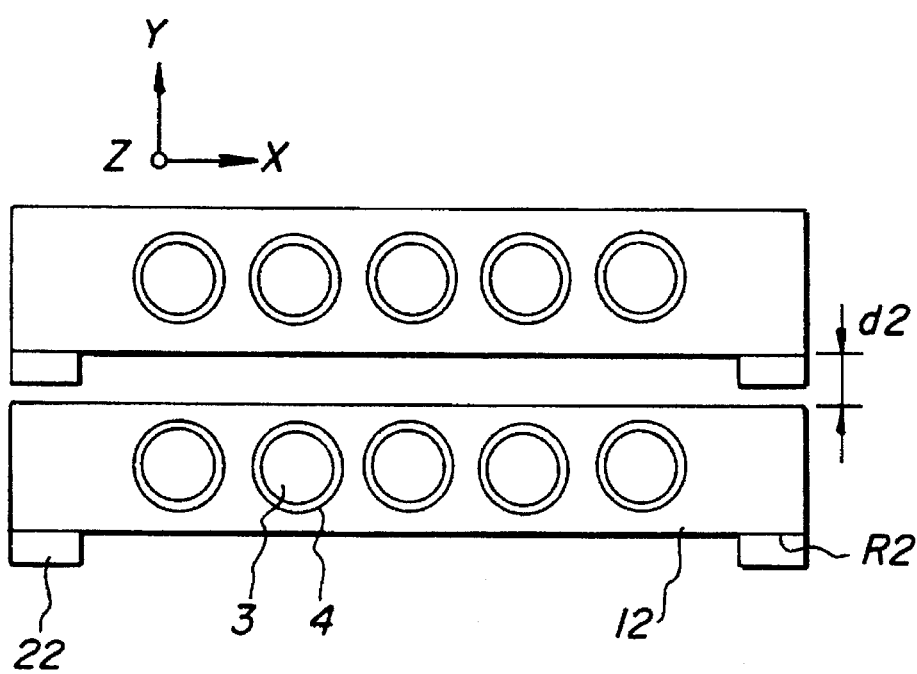
FIG. 23 is a front view of the principal portion of a variation.

FIG. 23 is a front view of a principal portion of another embodiment. In this embodiment, a gap d2 provided between bar bodies 12 also absorbs an error of a single bar body 12. Similarly to the embodiment of FIG. 22, no errors are accumulated in accumulating the light emitting devices along the Y axis, and the difference in position of the light emitting devices along the Y axis is produced only by the pitch error of the supporting member 22 on which the bar body 2 is placed.

However, when the gap d2 of the light emitting devices along the Y axis is large as shown in FIG. 23, the pitch of beams increases if the aperture of the lens 3 is not sufficiently large, so that the beam processing cannot be finely performed. If the aperture of the lens 3 is increased, however, the size of the entire light source unit 60 increases, so that the cost increases. If the width of the bar body is increased to increase the pitch of a beam, and the lens barrel 4 and the aperture of the lens 3 provided therein are increased accordingly, only a portion of a fan-shaped laser beam in the vicinity of the optical axis AX (see FIG. 21) is used, so that the efficiency in using the laser beams deteriorates.

In view of the above, in the embodiment of FIGS. 20 to 22, in order to reduce the size and cost, the reference surface R1 is constituted by a concave portion 26 provided at a portion where the light emitting device is not fixed. The concave portion 26 is formed by providing a difference in level by thinning both ends of the bar body 2 at under surfaces thereof. The supporting member 22 is fitted in the concave portion 26 as shown in FIG. 22 when the bar body 22 is fixed. Consequently, if the bar bodies 2 placed on the supporting member 22 are accumulated, the light emitting devices are stuffed in an accumulation direction, that is, along the Y axis, so that the size along the Y axis is reduced. As a result, it is possible to concentratedly irradiate a large number of large-aperture beams onto a narrow area.

The processing of the bar body 12 in manufacturing is easy in the embodiment of FIG. 23 compared to the embodiment of FIGS. 20 to 22 where the reference surface R1 is constituted by a concave portion, since the entire of the lower surface of the bar body 12 can be formed into the reference surface R2.

According to the above-described embodiments, the assembling accuracy of a laser chip provided in a package (corresponding to the laser diode 1 in this embodiment) having one chip can be of plus or minus 10 µm order.

The fixing of the laser diode 1 and optical system 8 to the bar body 2 can be made through YAG laser welding.

Figure 24:
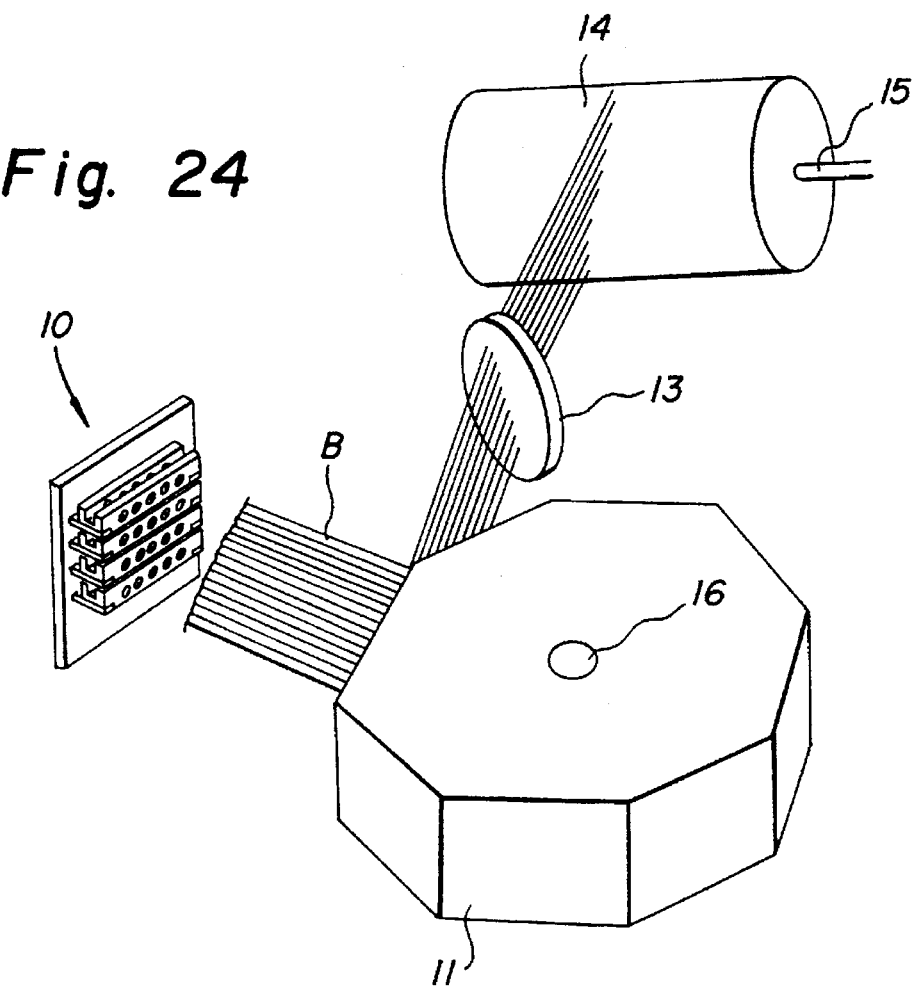
FIG. 24 is an appearance perspective view schematically showing a manner in which an image is formed in a laser printer incorporating the fourth embodiment of the present invention.

FIG. 24 is a laser printer incorporating the light source unit 60 of the fourth embodiment. The workings of the light source unit 60 are the same as those of the laser printer of FIG. 6. According to the laser printer of FIG. 24, however, it is possible to increase the processing speed (image forming speed) through multi beam scanning by use of a plurality of laser beams. Moreover, by increasing the scale of the light source unit 10 at need, the processing speed can be increased by a required amount. Since the beam pitch can be decreased, it is possible to form higher-quality images.

As described above, since the light source unit 60 of the fourth embodiment is provided with a plurality of light emitting devices, a plurality of bar bodies 2 having reference surfaces R1 and fixing the light emitting devices to a predetermined position with respect to the reference surface R1, and a substrate 24 on which supporting members 22 for supporting the fixing members through contact with the reference surfaces R1 are arranged in parallel with each other at predetermined intervals, a light source unit where the position of the light emitting devices having a predetermined two-dimensional arrangement are appropriately arranged can be realized. As a result, it is possible to form higher-quality images.

Since the reference surface R1 is constituted by a concave portion provided at a portion where the light emitting device is not fixed, the size of the entire light source unit along the supporting member 22 can be reduced. As a result, the cost of the light source unit can be reduced.

Figure 25:
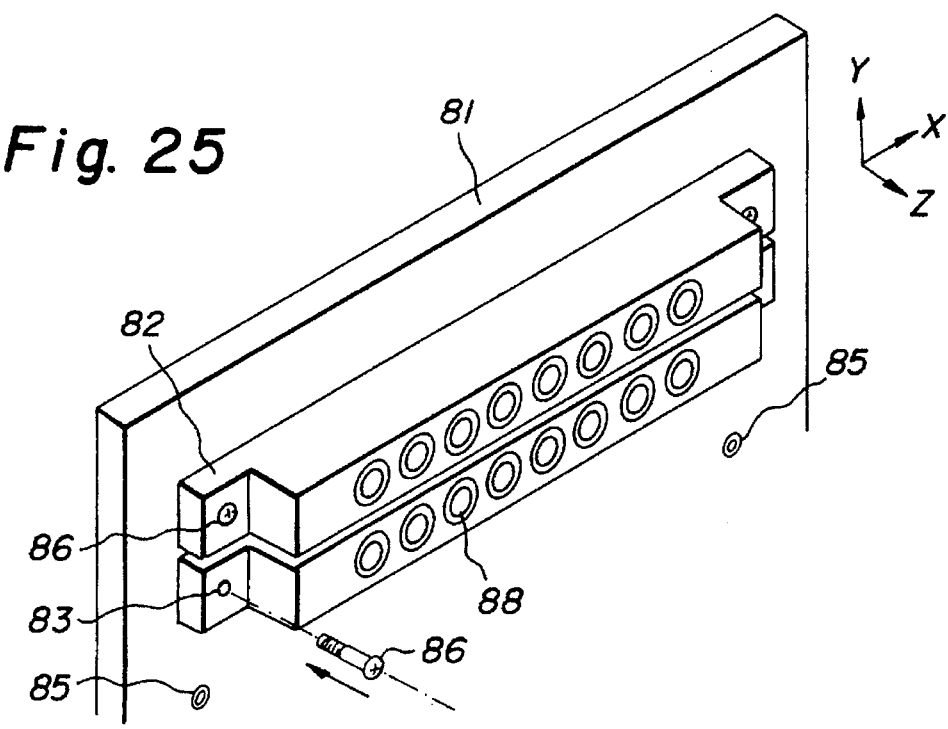
FIG. 25 is an explanatory view of a schematic arrangement of a prior art.

While a means for fixing the bar body to the substrate is not specifically disclosed in the above description of the fourth embodiment, screws may be used for the fixing as shown in FIG. 25.

That is, tapped holes 83 are provided at both ends of the bar body 82, and in correspondence therewith, tapped holes 85 are provided on the substrate 81. Conventionally, the bar body 82 is fixed to the substrate 81 by joining the tapped holes 83 and 85 and then screwing a screw 86 thereinto.

However, since the tapped holes 83 and 85 are also used as reference holes with respect to the directions of the X and Y axes, it is difficult to form the holes 83 and 85 accurately at the same interval in the bar body 82 and the substrate 81. For example, the holes 83 and 85 are apt to be processed into inclined forms, or the bar body 82 is fixed in an inclined condition because of interference between the pin portion of the screw 86 and the abutment portion of the bar body 82. As a result, beams are not emitted, in a predetermined arrangement, from the light emitting device.

A fifth embodiment of the present invention is intended to solve such a problem and to realize a light source unit which can irradiates beams in a predetermined arrangement with a high accuracy.

Figure 26:
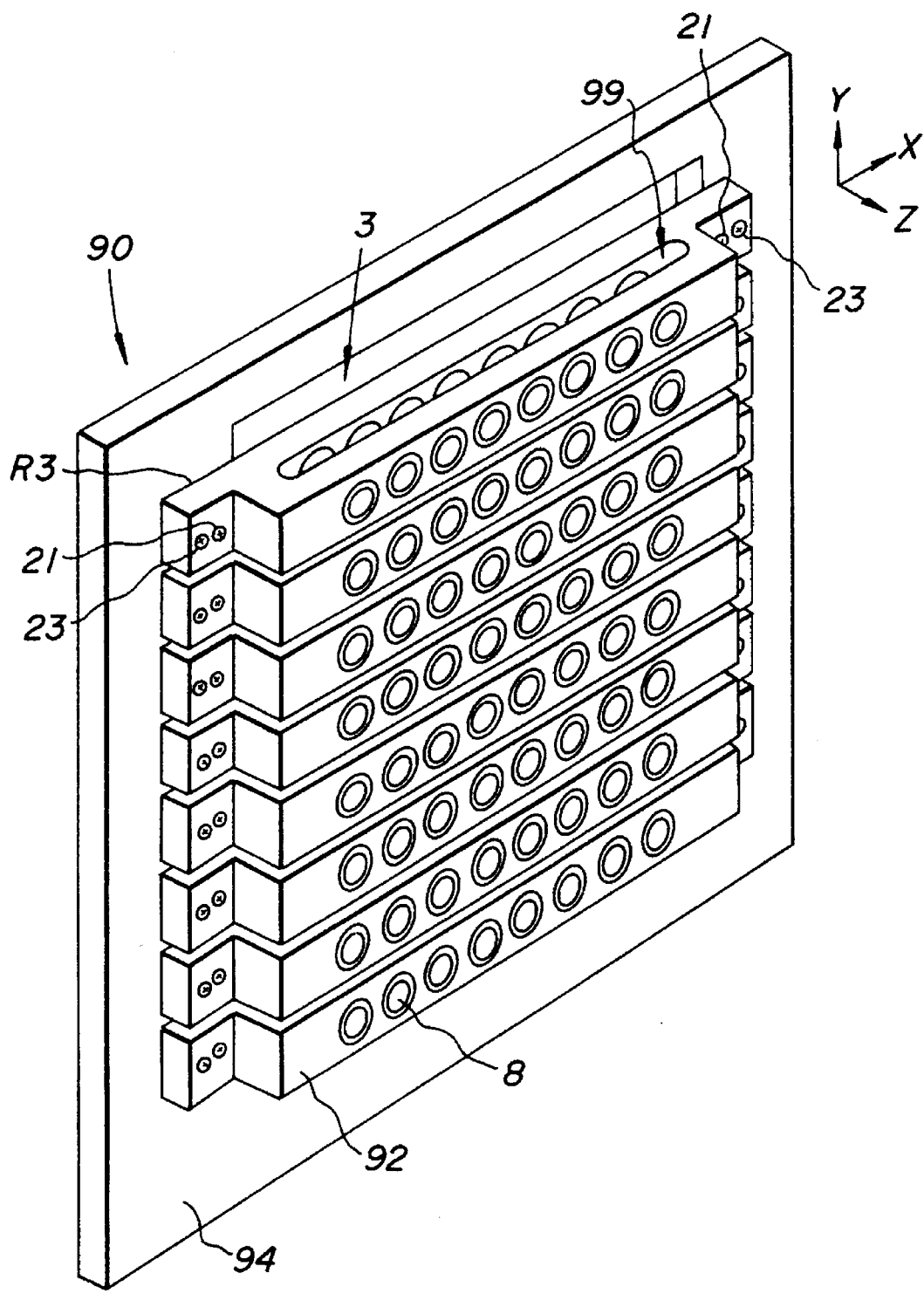
FIG. 26 is an appearance perspective view of an arrangement of a fifth embodiment of the present invention.
Figure 27:
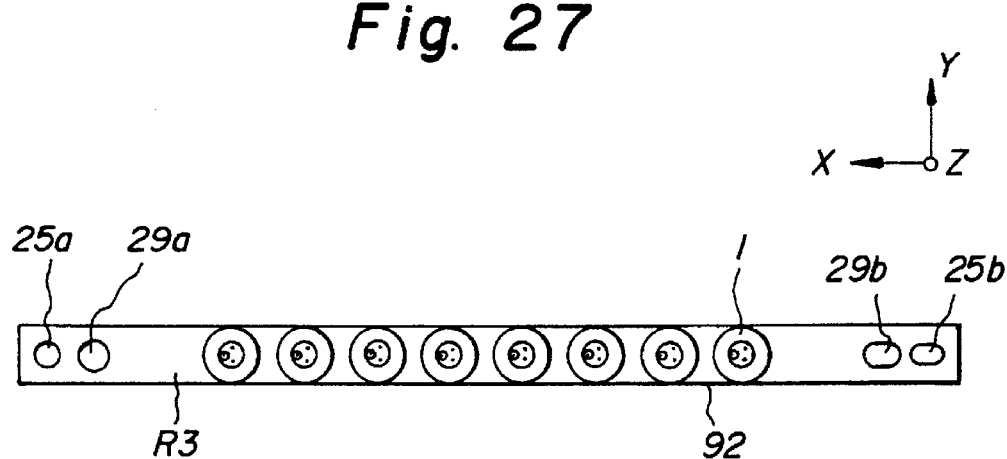
FIG. 27 is a rear view of a principal portion of the fifth embodiment of the present invention.
Figure 28:
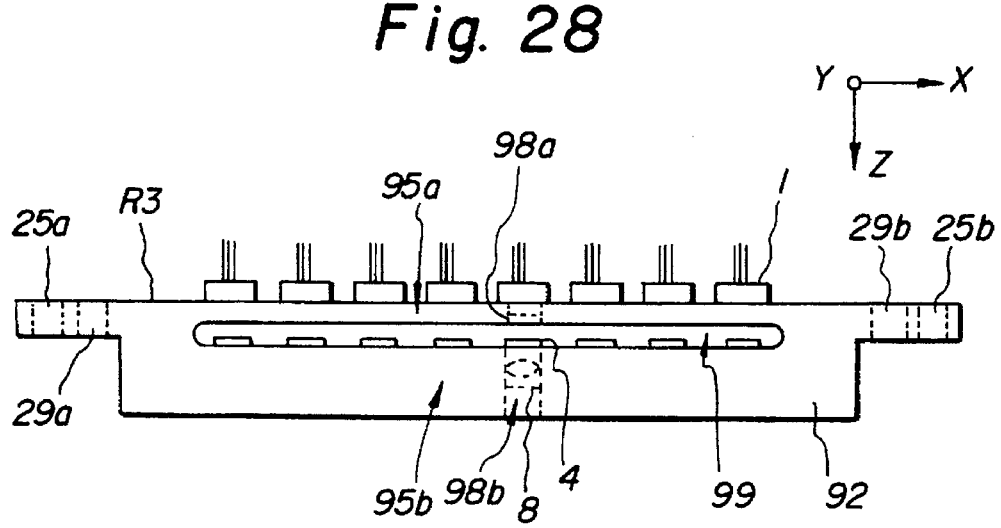
FIG. 28 is a plan view of the principal portion of the fifth embodiment of the present invention.
Figure 29:
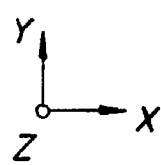
FIG. 29 is a front view of the principal portion of the fifth embodiment of the present invention.
Figure 29:
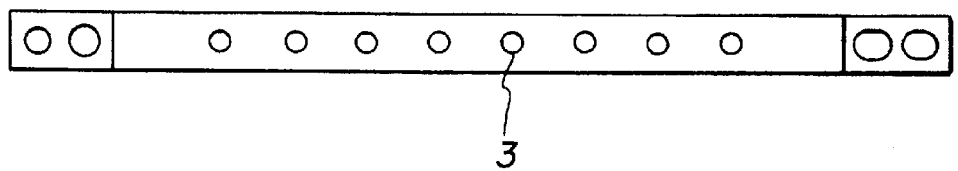

The fifth embodiment of the present invention will hereinafter be described with reference to the drawings. FIG. 26 is a perspective view schematically showing a general arrangement of the fifth embodiment. FIGS. 27, 28 and 29 are a rear view, a plan view and a front view showing a principal portion of the fifth embodiment, respectively.

A light source unit 90 of this embodiment shown in FIG. 26 is provided with a plurality of laser diodes 1 as shown in FIGS. 27 and 28, a bar body 92 having one reference surface R3 (the flexibility is of 20 µm) as shown in FIGS. 26 to 28 and fixing the laser diode 1 under a condition where the laser diode 1 is in contact with the reference surface R3, and a substrate 94 fixing the bar body 92 under a condition where the bar body 92 is in contact with the reference surface R3 as shown in FIG. 26. The laser diode 1 serves as a light emitting device, while the bar body 92 serves as a fixing member to which the laser diode 1 is fixed.

As shown in FIGS. 26 and 28, the bar body 92 is provided with a plurality of optical systems 8, in correspondence with the laser diodes 1, for converting a laser beam emitted from each laser diode 1 into a parallel beam.

Moreover, in the bar body 92, a pair of positioning holes 29a and 29b (FIGS. 27 and 28) into which a subsequently-described positioning pin 21 (FIG. 26) is inserted and a pair of fixing holes 25a and 25b into which a fixing screw 23 is screwed (FIG. 26) are formed.

As shown in FIG. 28, a plurality of holes 98a into which the laser diodes 1 is inserted are formed in an array form on an attachment portion 95a arranged on one side of a groove 99, while on an attachment portion 95b arranged on the other side of the groove 99, a plurality of holes 98b into which the optical systems 8 are inserted are formed in an array.

The holes 98a and 98b are arranged opposite to each other so that the optical axis can be adjusted when the laser diodes 1 and the optical systems 8 are inserted thereinto, respectively, and arranged in a form corresponding to a required arrangement of laser beams (along the X axis), respectively.

As shown in FIG. 28, the laser diode 1 is fixed through YAG laser welding under conditions where a tip thereof is being inserted into the hole 98a and where a part thereof is in contact with the reference surface R3. That is, the laser diode 1 is attached by inserting a smaller-diameter portion of the laser diode 1 including a smaller-diameter portion and a larger-diameter abutment portion, abutting the larger diameter abutment portion to the reference surface R3 and then fixing it in the above-described manner after positioning it by use of the reference surface R3.

As shown in FIG. 26, the bar body 92 to which the laser diode 1 is fixed in a row along the X axis is arranged in a two-dimensional array so that each row of light emitting device is arranged at equal intervals by accumulating the bar bodies 2 along the Y axis by fixing them to the substrate 94.

The bar body 92 is fixed to the substrate 94 in the following manner: First, positioning holes 29a and 29b (FIGS. 27 and 28) are adjusted to a positioning pin (parallel pin) 21 inserted into holes (not shown) provided at equal intervals on the substrate 94, and the bar body 92 is inserted thereinto. Then, a fixing screw 23 is screwed, as shown in FIG. 26, into a tapped hole (not shown) provided on the substrate 94 through fixing holes 25a and 25b provided at both ends of the bar body 92.

Specifically, the positioning with respect to the directions of the X and Y axes is performed by inserting the positioning pin 21 with a diameter of 4.000 to 4.005 mm into the positioning holes 29a and 29b with a diameter of 4.000 to 4.020 mm. The positioning with respect to the direction of the Z axis is performed by fixing the bar body 92 to the substrate 94, that is, by screwing the fixing screw 23 into the fixing holes 25a and 25b with a diameter of 3.4 mm.

As described above, the positioning with respect to the direction of the X and Y axes is realized within a common difference (for example, 20 µm) between the internal diameters of the pin 21 and reference holes 29a and 29b. Concerning the inclination, the bar body 92 abuts against the substrate 94 with an abutment accuracy of 20 µm torsion. By separately performing the fixing and positioning, the assembling accuracies are separately obtained with respect to the directions of the X and Y axes and the inclination.

A hole 34 of the substrate 94 is provided to enable a connection of a lead wire outside the light source unit 90 through the hole 34.

Since the reference surface R3 is used both as a reference surface used for the abutment of the bar body 92 and as a reference surface used for the abutment of the laser diode 1, it is necessary to mill, process and polish only one surface. As a result, the cost can be reduced. Since the accuracy required for the position relationship between reference surfaces are not required, the assembling accuracy can be increased, the cost can be reduced, and the size can be reduced through the size reduction of the bar body 92 and improvement in integration efficiency.

Moreover, since the assembling accuracy is not influenced by a manner in which the fixing screw 23 is screwed and a manner of abutment, the bar body 92 can accurately be attached at equal intervals, with the same perpendicularity accuracy and at a low cost, and compatibility can be provided thereto.

As described above, in the light source unit 90 of the fifth embodiment, the positioning holes 29a and 29b and the fixing holes 25a and 25b are provided to a plurality of light emitting device, the bar body 92 which serves as a fixing member for fixing the light emitting device and the substrate 94 to which the bar body 92 is fixed, respectively. The positioning of the bar body 92 and the substrate 94 is performed by inserting the pin 21 into the holes 29a and 29b, and the fixing of the bar body 92 to the substrate 94 is made by screwing the fixing screw 23 into the fixing holes 25a and 25b. Consequently, a light source unit can be realized which irradiates beams accurately in a predetermined arrangement.

This is because a hole for a pin is more accurately formed than a hole for a screw. Therefore, if the bar body 92 is fixed through a screw after it is accurately positioned relative to the pin, the arrangement accuracy of the fixing member is higher compared to conventional ones. As a result, it is possible to form higher-quality images by the light source unit of the fifth embodiment.

The above-mentioned light source unit can be realized in a simple arrangement where a pair of positioning holes 29a and 29b and a pair of fixing holes 25a and 25b are provided to each fixing member.

Moreover, according to the previously-described fourth embodiment, since it is necessary to provide to the bar body 2 the reference surface R1 which is an abutment surface against the supporting member 22 and the reference surface R2 which is an abutment surface against the laser diode 1, two reference surfaces with an excellent profile irregularity are required for one bar body 2. As a result, the cost increases. Further, since the supporting member 22 is present between the bar body 2 and the substrate 24, it is impossible to reduce the size of the entire light source unit.

On the contrary, according to the fifth embodiment, since it is necessary to provide only one reference surface R3 to the bar body 92, the cost and size of the light source unit can be reduced. Further, since a plurality of light emitting devices are fixed to the bar body 92 under a condition where they are in contact with the reference surface R3 and the bar body 92 is fixed under a condition where it is in contact with the reference surface R3, the light emitting devices are fixed to the substrate 94 at accurate positions.

Obviously, many modifications and variations of the present invention are possible in light of the above teachings. It is therefore to be understood that within the scope of the appended claims, the invention may be practiced other than as specifically described.

What is claimed is:

1. A method of manufacturing a light source unit, comprising the steps of:

providing a light beam supplying means;

providing a fixing member configured to have said light beam supplying means connected thereto;

arranging said light beam supplying means at a predetermined position on said fixing member, such that said light beam supplying means can supply a light beam along an axis which is perpendicular to a surface of the fixing member;

laser welding said light beam supplying means to said fixing member, said laser welding being performed simultaneously at a first contact point and a second contact point of a periphery of said light beam supplying means and said one surface of the fixing member, said first point and said second point being on opposite sides of the periphery of the light beam supplying means.

2. A method of manufacturing a light source unit, said method comprising the steps of:

providing a light supplying means;

providing a fixing member;

arranging said light supplying means on said fixing member such that an optical axis of the light beam supplying means is perpendicular to a surface of the fixing member;

laser welding said light beam supplying means to said fixing member, said laser welding being performed simultaneously at a first point and a second point along a periphery of the light beam supplying means, thereby welding the periphery of the light beam supplying means to the one surface of the fixing member, said first point and said second point being on opposite sides of the periphery of the light beam supplying means;

determining if a shifting of the light beam supplying means occurred during the laser welding;

correcting a position of the light beam supplying means by laser welding at a third point located on the periphery of the light beam supplying means.

* * * * *